(12) United States Patent
Lin et al.

(10) Patent No.: US 11,435,867 B2
(45) Date of Patent: Sep. 6, 2022

(54) DISPLAY METHOD AND ELECTRONIC DEVICE USING THE SAME

(71) Applicant: Ching-Chen Lin, Keelung (TW)

(72) Inventors: Ching-Chen Lin, Keelung (TW); Chih-Yu Lin, Keelung (TW); Thuản Thiên Tchen, Ho Chi Minh (VN)

(73) Assignee: Ching-Chen Lin, Keelung (TW)

( * ) Notice: Subject to any disclaimer, the term of this patent is extended or adjusted under 35 U.S.C. 154(b) by 0 days.

(21) Appl. No.: 16/883,964

(22) Filed: May 26, 2020

(65) Prior Publication Data

US 2021/0373714 A1    Dec. 2, 2021

(51) Int. Cl.
*G06F 3/0484* (2022.01)
*G06F 3/0481* (2022.01)
*G06F 3/04842* (2022.01)
*G06F 3/04883* (2022.01)

(52) U.S. Cl.
CPC ........ *G06F 3/0481* (2013.01); *G06F 3/04842* (2013.01); *G06F 3/04883* (2013.01)

(58) Field of Classification Search
None
See application file for complete search history.

(56) References Cited

U.S. PATENT DOCUMENTS

| | | | | |
|---|---|---|---|---|
| 8,726,198 B2* | 5/2014 | Rydenhag | ........... | G06F 3/04883 345/173 |
| 2009/0094562 A1* | 4/2009 | Jeong | ................. | G06F 3/04883 715/863 |
| 2014/0218309 A1* | 8/2014 | Park | ..................... | G06F 1/1626 345/173 |
| 2015/0022471 A1* | 1/2015 | Kwak | .................. | G06F 1/3262 345/173 |
| 2015/0130737 A1* | 5/2015 | Im | ....................... | G06F 3/04886 345/173 |
| 2015/0242061 A1 | 8/2015 | Patel et al. | | |
| 2016/0132477 A1 | 5/2016 | Ghosh et al. | | |
| 2016/0291865 A1 | 10/2016 | Kwak et al. | | |
| 2018/0018084 A1* | 1/2018 | Kim | ................... | G06F 3/04883 |
| 2018/0059841 A1* | 3/2018 | Ikeda | .................... | G06F 1/3203 |

FOREIGN PATENT DOCUMENTS

CN    104965640    10/2015

* cited by examiner

*Primary Examiner* — Krishna P Neupane
(74) *Attorney, Agent, or Firm* — Raymond Chan

(57) ABSTRACT

A display method adapted for an electronic device is provided. The method includes: identifying a target location of the last triggered target point on a screen, wherein the target point is triggered by an input operation applied on an I/O device of the electronic device; setting, according to an identified preset dividing pattern, a target dividing line on the screen based on the target location; identifying, according to an identified preset covering pattern, a target region and one or more non-target regions other than the target region of the screen based on the target dividing line; and adjusting the one or more non-target regions of the screens to decrease the readability of the one or more non-target regions.

20 Claims, 25 Drawing Sheets

DISPLAY METHOD AND ELECTRONIC DEVICE USING THE SAME

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The invention relates to a display method related to reading and an electronic device using the display method.

Description of Related Arts

With the development of technology, the use of electronic devices to read articles and absorb information has become increasingly popular. However, when there is too much text content on a page, the user will not be able to focus on the words that are currently being read.

Based on this, how to develop a more efficient and convenient display method to improve the reading function provided by the electronic device is a goal for the development of those skilled in the art.

SUMMARY OF THE PRESENT INVENTION

A display method and an electronic device using the method are providing a more efficient and convenient display function, so as to improve a reading function provided by the electronic device.

According to an aspect of the invention, there is provided a display method adapted for an electronic device. The display method includes: identifying a target location of a target point which is triggered last in an image, wherein the image is an interface, which is displayed in a screen of the electronic device, of an application performed in the electronic device, wherein the target point is triggered by an input operation applied on a I/O device of the electronic device; setting, according to an identified preset separation pattern, a target separation line on the image based on the target location; identifying, according to an identified preset covering pattern, a target region and one or more non-target regions other than the target region of the image based on the target separation line; and adjusting the one or more non-target regions to decrease a readability of the one or more non-target regions.

In an embodiment of the invention, the target point includes a touch point touched by a user on the screen, wherein the screen is a touch screen; a touch point, which is touched or pressed by the user, on an edge of a body of the electronic device; a cursor displayed in the screen; or a movable indicator displayed in the screen, wherein a location of the movable indicator is changed by an input operation performed to the I/O device of the electronic device by the user.

In an embodiment of the invention, the preset separation pattern includes one of patterns below: (1) a first separation pattern, wherein, in response to identifying that the preset separation pattern is the first separation pattern, the step of setting the target separation line on the image based on the target location includes identifying a target content region corresponding to the target location among a plurality of content regions in the image; and setting the target separation line corresponding to the target content region is a separation line between the target content region and an adjacent content region. (2) a second separation pattern, wherein, in response to identifying that the preset separation pattern is the second separation pattern, the step of setting the target separation line on the image based on the target location includes setting a virtual horizontal line on the target location as the target separation line. (3) a third separation pattern, wherein, in response to identifying that the preset separation pattern is the third separation pattern, the step of setting the target separation line on the image based on the target location includes setting a virtual vertical line on the target location as the target separation line.

In an embodiment of the invention, the preset covering pattern comprises one of patterns below: (1) a first covering pattern, wherein, in response to identifying that the preset covering pattern is the first covering pattern, the step of identifying the target region and the one or more non-target regions other than the target region of the image based on the target separation line includes identifying a region above the target separation line in the image is the target region; and identifying a region under the target separation line in the image is the non-target region. (2) a second covering pattern, wherein, in response to identifying that the preset covering pattern is the second covering pattern, the step of identifying the target region and the one or more non-target regions other than the target region of the image based on the target separation line includes identifying a region under the target separation line in the image is the target region; and identifying a region above the target separation line in the image is the non-target region. (3) a third covering pattern, wherein, in response to identifying that the preset covering pattern is the third covering pattern, the step of identifying the target region and the one or more non-target regions other than the target region of the image based on the target separation line includes identifying a region on the right of the target separation line in the image is the target region; and identifying a region on the left of the target separation line in the image is the non-target region. (4) a fourth covering pattern, wherein, in response to identifying that the preset covering pattern is the fourth covering pattern, the step of identifying the target region and the one or more non-target regions other than the target region of the image based on the target separation line includes identifying a region on the left of the target separation line in the image is the target region; and identifying a region on the right of the target separation line in the image is the non-target region.

In an embodiment of the invention, in response to the preset separation pattern is the first separation pattern and the identified triggered target point is moved from the target content region to the adjacent content region, the adjacent content region is identified as a new target content region, and a separation line between the adjacent content region and another adjacent content region adjacent to the adjacent content region is set as a new target separation line, so as to substitute the old target separation line, wherein the identified new target region and new one or more non-target regions are adjusted according to the new target separation line.

In embodiment of the invention, the step of adjusting the one or more non-target regions to decrease a readability of the one or more non-target regions includes one of a plurality of steps below: decreasing a brightness of the one or more non-target regions; using a translucent color block to cover the one or more non-target regions; using an opaque color block to cover the one or more non-target regions; and using an information content to cover the non-target regions.

According to a further aspect of the invention, there is provided an electronic device. The electronic device includes a storage device, an input/output device (I/O device) and a processor. The storage device is configured to store program codes. The processor is electronically coupled to the storage device and the I/O device. Furthermore, the processor is configured to perform an application, and display an image corresponding to an interface of the application via the I/O device. The processor is further configured to execute the program codes to implement a display method, and the display method comprises: identifying a target location of a target point which is triggered last in the image, wherein the target point is triggered by an input operation applied on the I/O device of the electronic device; setting, according to an identified preset separation pattern, a target separation line on the image based on the target location; identifying, according to an identified preset covering pattern, a target region and one or more non-target regions other than the target region of the image based on the target separation line; and adjusting the one or more non-target regions to decrease a readability of the one or more non-target regions.

Based on above, the display method and the electronic device provided by the embodiments of the invention are capable of setting a corresponding target separation line by detecting a target location of a triggered target point, so as to efficiently identify a target region and a non-target region(s) on an image of the electronic device. Accordingly, the provided display method and the electronic device may adjust the non-target region to decrease the readability of the non-target region, such that the user may focus on the content currently read, so as to improve the efficiency of the electronic device and increase the functionality of the displaying performed by the electronic device.

According to the invention, it is possible to adjust a period of time required for detecting an abnormality occurring in a control object.

DETAILED DESCRIPTION OF THE PREFERRED EMBODIMENT

Figure 1:
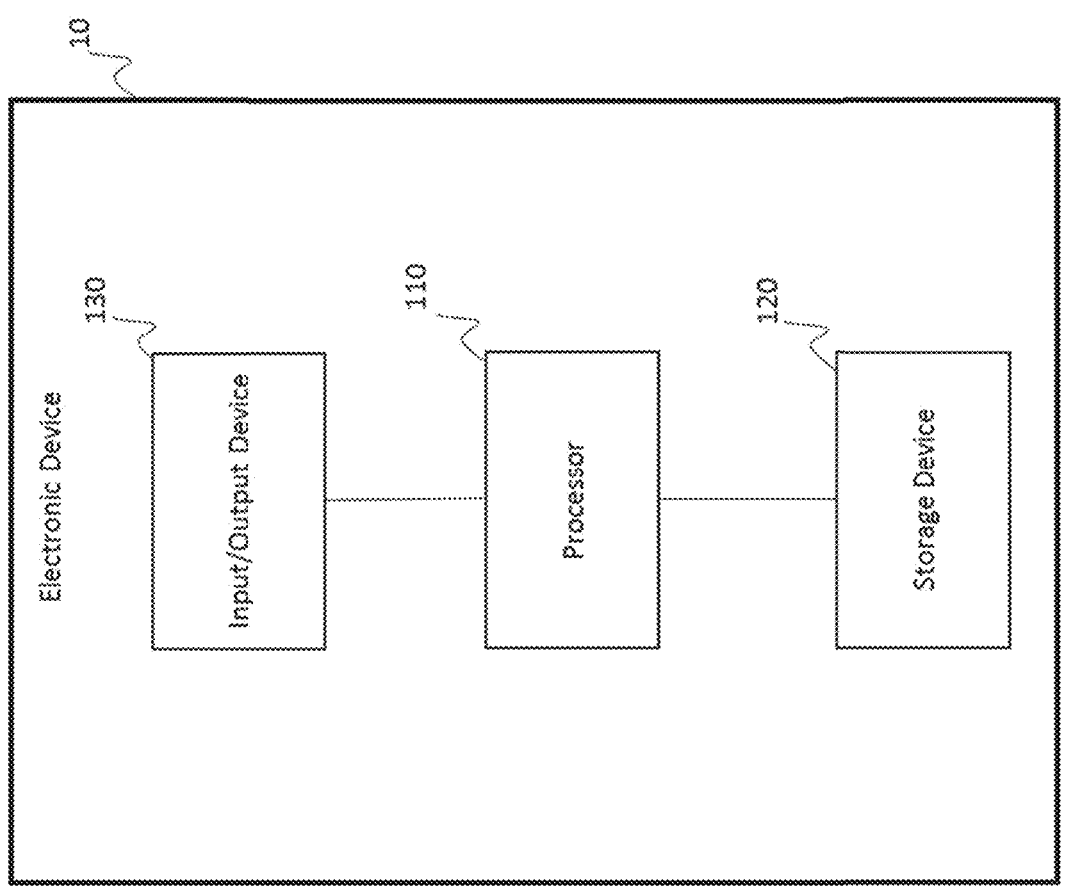
FIG. 1 is a schematic block diagram illustrating an example of a hardware configuration of an electronic device according to an embodiment of the invention.

An embodiment of the invention will be described below in detail with reference to the accompanying drawings. The same or corresponding elements in the drawings will be referenced by the same reference signs and description thereof will not be repeated.

The foregoing and other technical contents, features and effects of the present invention will be clearly presented in the following detailed description with reference to one of the preferred embodiments of the drawings. Direction terms mentioned in the following embodiments, for example: up, down, left, right, front or back, etc., are only for the directions referring to the attached drawings. Therefore, the directional terminology is used to illustrate rather than limit the invention.

FIG. 1 is a schematic block diagram of an electronic device according to an embodiment of the invention. Please refer to FIG. 1, in this embodiment, the electronic device 10 includes a processor 110, a storage device 120 and an input/output device (I/O device) 130. The electronic device 10 is, for example, a suitable electronic device such as a personal computer, a notebook computer, an e-book reading device, an electronic whiteboard, a tablet computer, a smart phone, a smart watch, a head-mounted display.

In the embodiment, the storage device 120 may record some data that needs to be stored for a long time through instructions of the processor 110, for example, program code, software, or firmware used to control the electronic device 10. The storage device 120 may be any type of hard disk drive (HDD), non-volatile memory circuit module, or non-volatile memory storage device (e.g., solid state drive, SSD). The program code is, for example, a reading aid program or a display program for implementing the display method provided by the present invention. The software is, for example, various application programs executable by the electronic device 10, such as a browser program, a document reading program, an e-book reading program, and other suitable application programs.

The processor 110 is a hardware capable of computing, and is configured to manage the overall operation of the electronic device 10. That is, the processor 110 is a main hardware component for managing other hardware components of the electronic device 10. In this embodiment, the processor 110 is, for example, one core or multi-core central processing unit (CPU), a microprocessor, or other programmable processing units, Digital signal processor (DSP), Bluetooth low power micro controlling unit (BLE MCU), programmable controller, application specific integrated circuits (ASIC), programmable logic device (Programmable Logic Device, PLD) or other similar devices. In this embodiment, the processor 110 may perform a display operation by accessing and executing the reading assistance program or the display program to implement the display method provided by the embodiment of the present invention.

The I/O device 130 is configured to input data through input operations applied by a user, or to output sound or image. In one embodiment, the I/O device 130 is, for example, a touch screen. In another embodiment, the I/O device 130 may be a combination of an input device (e.g., mouse or keyboard) and an output device (e.g., screen/monitor).

Figure 2:
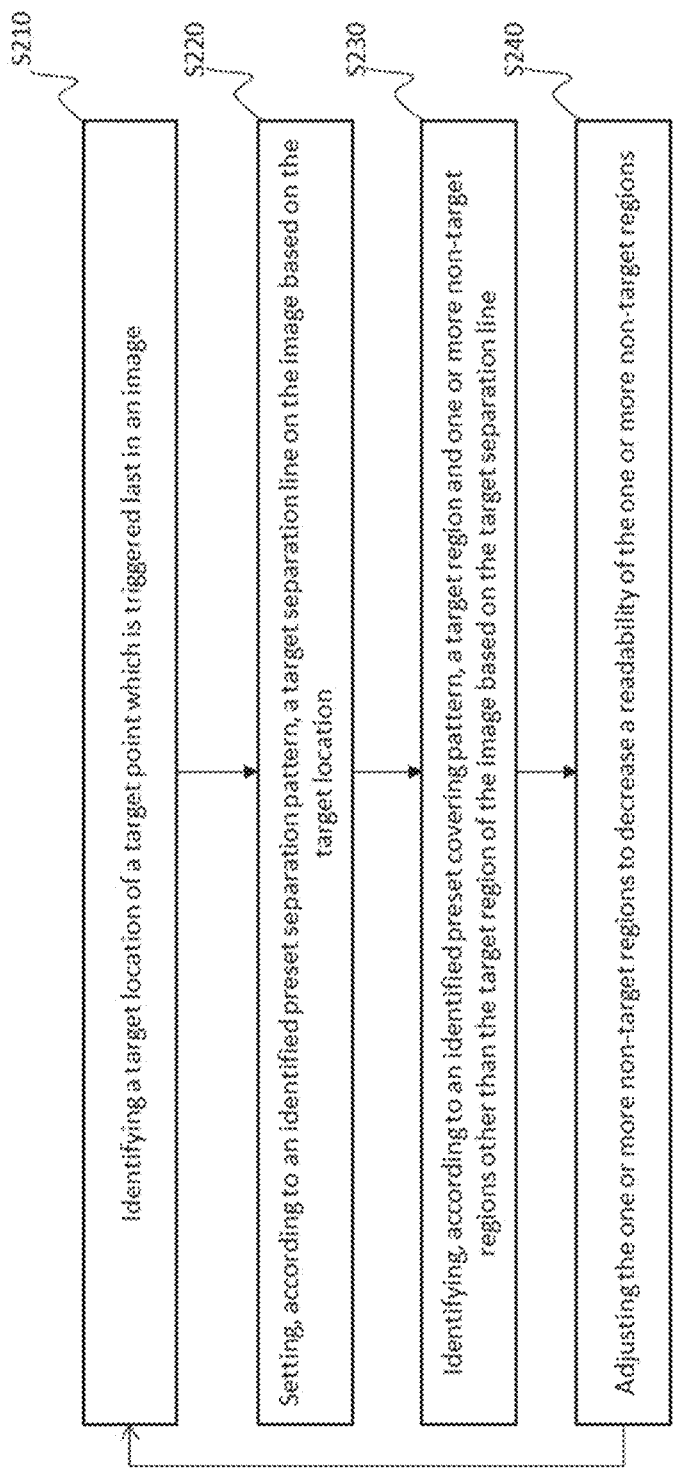
FIG. 2 is a flow chart of the display method according to an embodiment of the invention.

FIG. 2 is a flow chart of the display method according to an embodiment of the invention. Referring to FIG. 2, in step S210, the processor 110 identifies a target location of a target point which is triggered last in an image. For example, assuming that the I/O device 130 is a touch screen, the processor 110 can continuously identify a touched point in the image displayed on the touch screen 130 as the triggered target point by the touch screen 130. It should be noted that the currently identified target point is the last triggered target point.

Figure 3A:
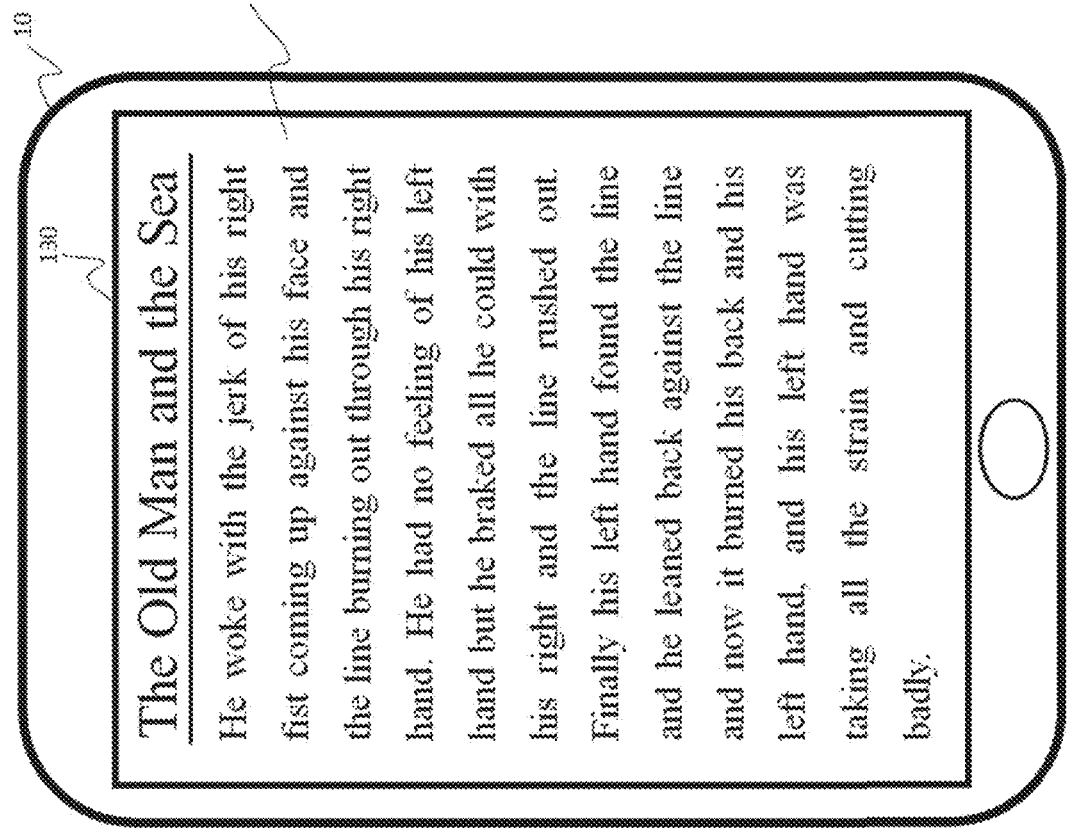
FIGS. 3A to 3B are schematic diagrams of identifying an triggered target point according to an embodiment of the invention.
Figure 3B:
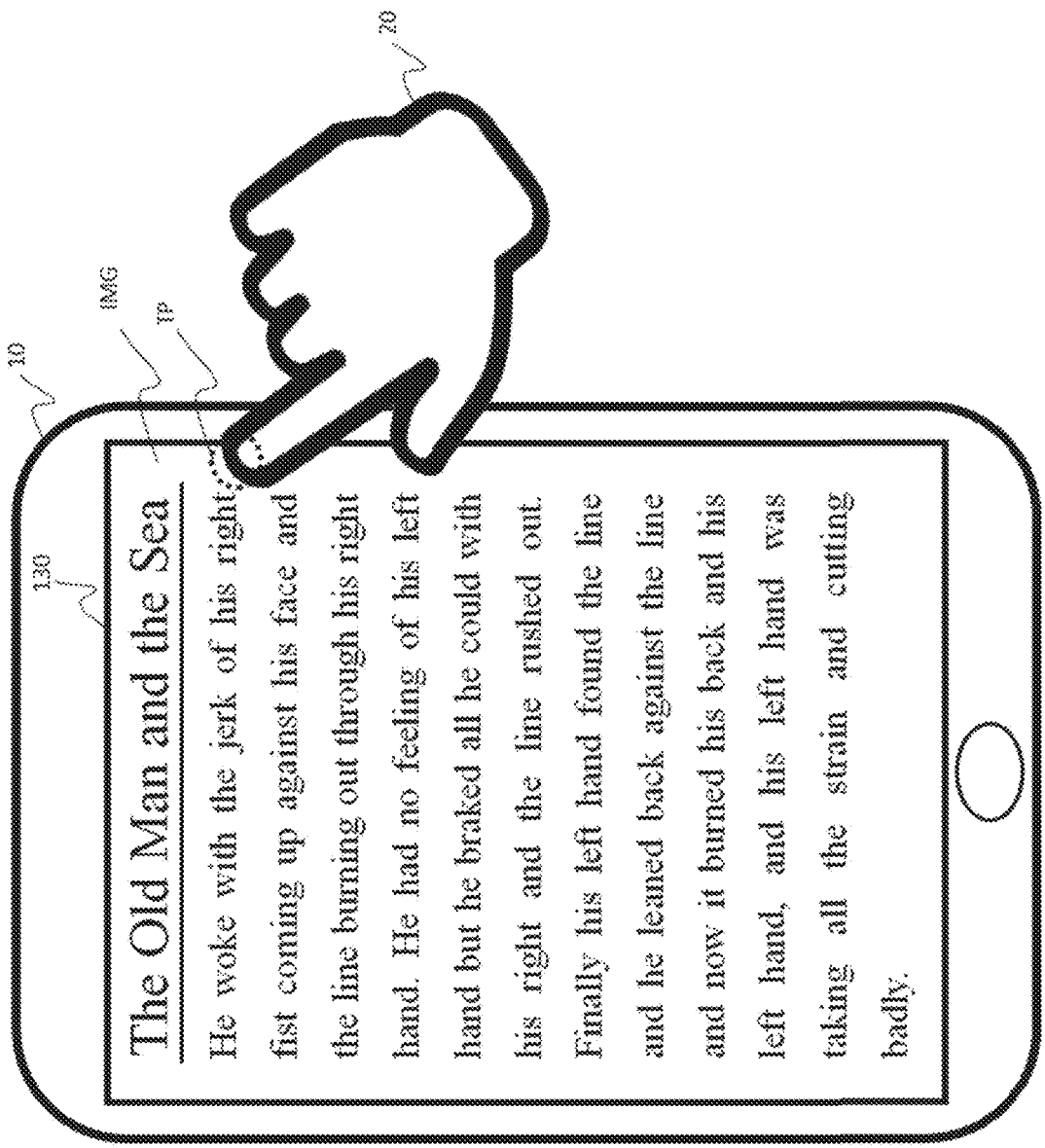

FIG. 3A to 3B are schematic diagrams of identifying a triggered target point according to an embodiment of the invention. Referring to FIG. 3A, for example, assume that the electronic device 10 is currently executing a document reading program (application program). The I/O device 130 displays an interface (e.g., image IMG) of the document reading program executed, and displays multiple lines of text in the image IMG.

Referring to FIG. 3B, following the example of FIG. 3A, it is further assumed that the user's hand 20 applies an input operation (e.g., touch operation) at a point TP (also called as a touch point) on the image IMG. The touch point TP will be recognized by the processor 110 as the triggered target point TP.

Figure 3C:
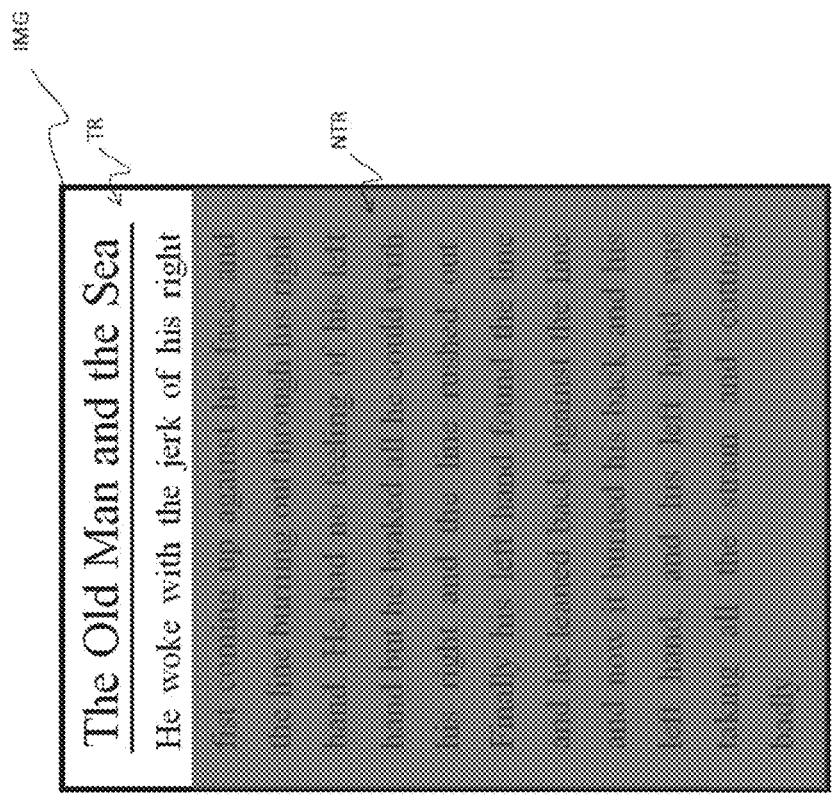
FIG. 3C is a schematic diagram of identifying a non-target region and adjusting the readability of the non-target region according to an embodiment of the invention.
Figure 3C:
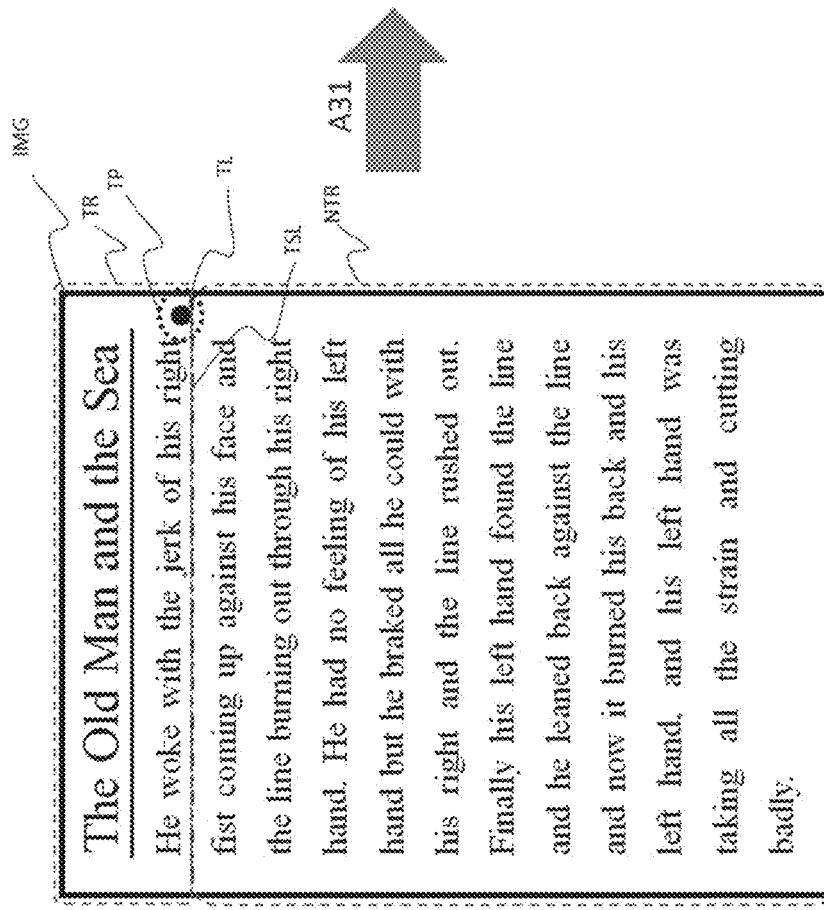

FIG. 3C is a schematic diagram of identifying a non-target region and adjusting the readability of the non-target region according to an embodiment of the invention. Please refer to FIG. 3C, in more detail, the processor 110 can identify the location TL (also referred to as the target location) of the target point TP in the image IMG through feedback of the I/O device 130.

Return to FIG. 2 again, in step S220, the processor 110 sets, according to an identified preset separation pattern, a target separation line on the image based on the target location. Specifically, the preset separation pattern includes one of the following patterns: (1) first separation pattern, (2) second separation pattern, and (3) third separation pattern. That is, the preset separation pattern may be predetermined as one of the three separation patterns.

In the embodiment, in response to identifying that the preset separation pattern is the first separation pattern, the step of setting the target separation line on the image based on the target location includes: identifying a target content region corresponding to the target location among a plurality of content regions in the image; and setting the target separation line corresponding to the target content region is a separation line between the target content region and an adjacent content region. Relevant details will be explained through FIGS. 9A to 9C.

Furthermore, in response to identifying that the preset separation pattern is the second separation pattern, the step of setting the target separation line on the image based on the target location includes setting a virtual horizontal line on the target location as the target separation line.

Moreover, in response to identifying that the preset separation pattern is the third separation pattern, the step of setting the target separation line on the image based on the target location includes setting a virtual vertical line on the target location as the target separation line. However, the first separation pattern is different from the second/third separation pattern in that the first separation pattern does not directly set the horizontal line/vertical line at the target position, but set, according to the boundary of a target content region (which is the target content region to which the target position belongs), a target separation line. In addition, it should be noted that if the first separation pattern is used, the generated/set target separation lines will not be overlaid on the text content, such that the user's reading experience would be improved.

Figure 9A:
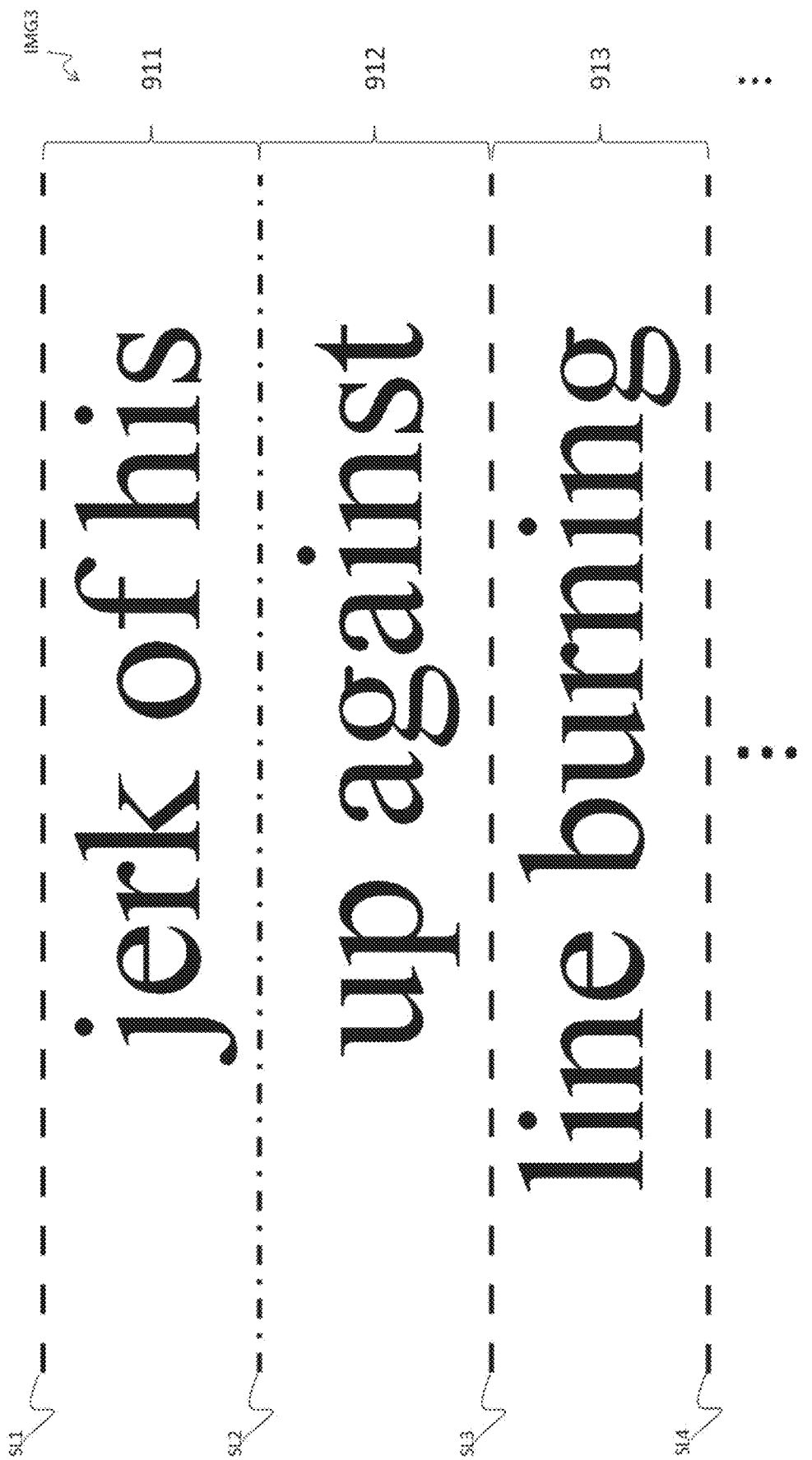
FIGS. 9A to 9C are schematic diagrams of setting a target separation line and correspondingly identifying a target region and a non-target region according to an embodiment of the invention.
Figure 9B:
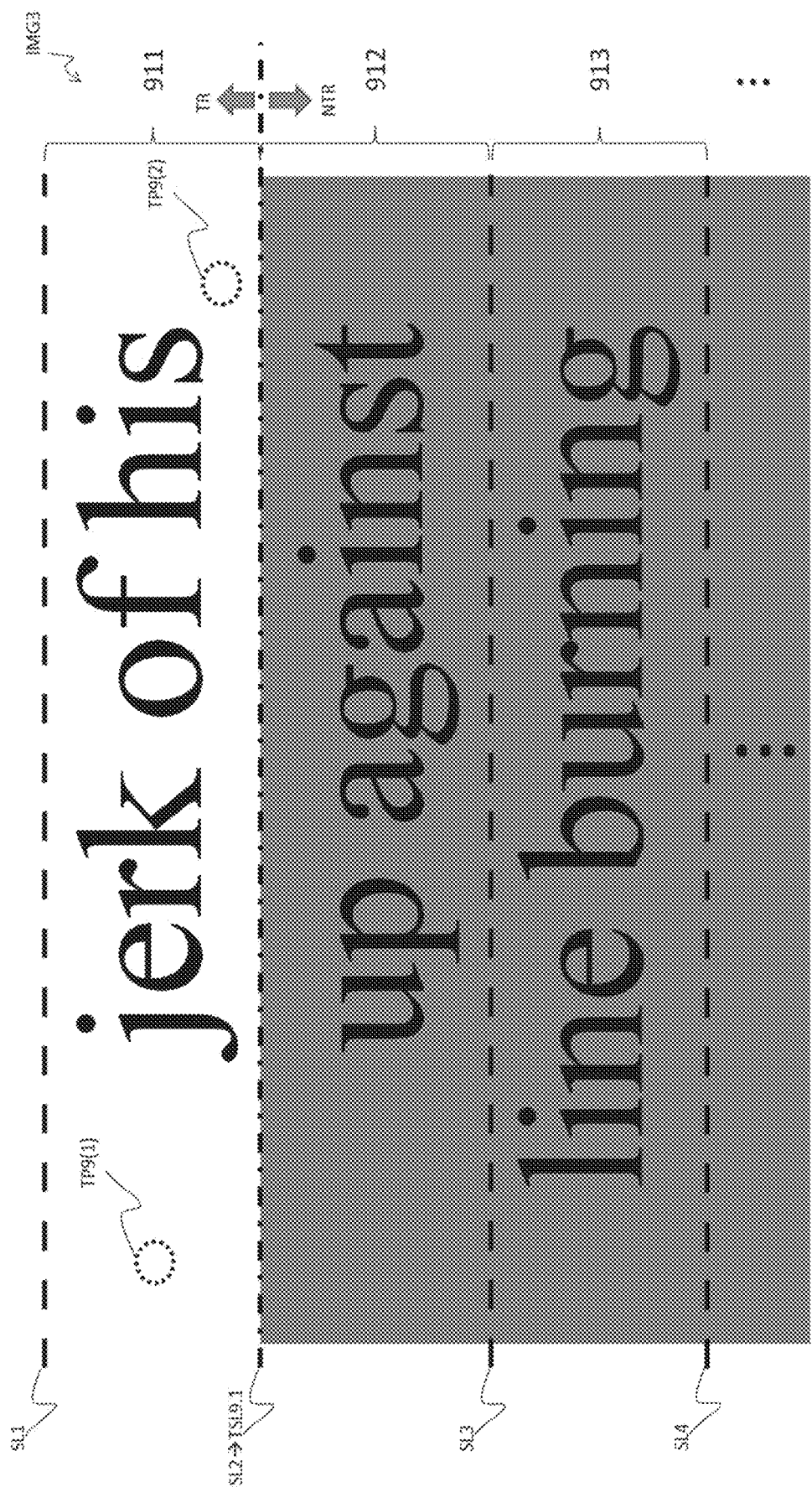
Figure 9C:
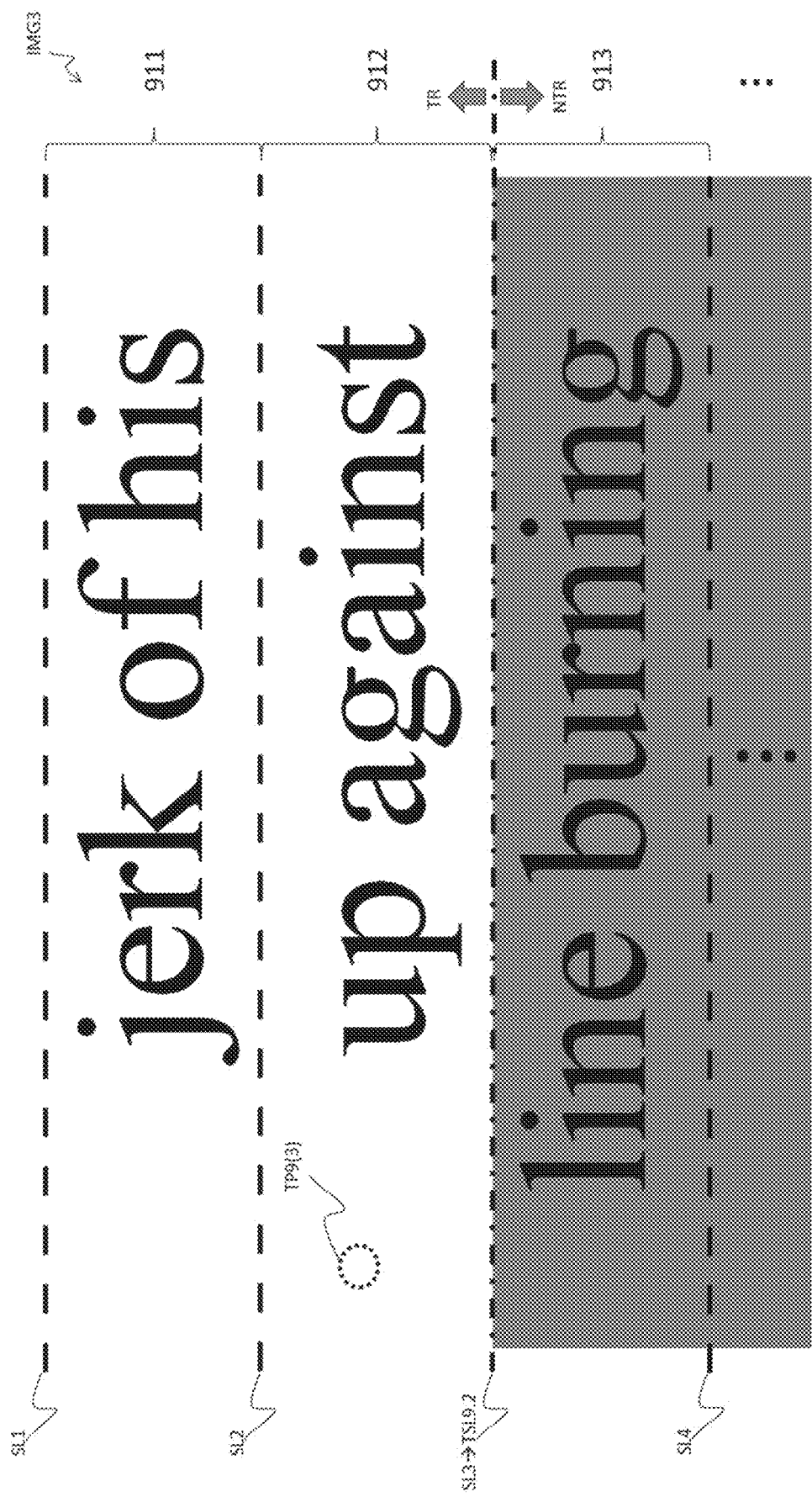

FIG. 9A to 9C are schematic diagrams of setting a target separation line and correspondingly identifying a target region and a non-target region according to an embodiment of the invention. Please refer to FIG. 9A, assuming that three lines of text content are displayed on the image IMG3, for example, "jerk of his" in the first line; "up against" in the second line; and "line burning" in the third line. In this example, as shown in FIG. 9A, the processor 110 may group the three lines of text content into content regions 911 to 913. In this embodiment, the processor 110 sets a plurality of virtual separation lines (e.g., separation lines SL2 to SL4) between the plurality of content regions to distinguish the plurality of content regions 911 to 913.

Please refer to FIG. 9B, following the example of FIG. 9A, assuming that the triggered target point TP9(1) or target point TP9(2) appears in the content region 911, the processor 110 may identify the content region 911 to which the target point TP9(1) or the target point TP9(2) belongs as the target content region, and set the separation line SL2 for separating the target content region 911 and the below adjacent content region 912 as the target separation line TSL9.1 (the text content in the adjacent content region 912 below is determined as the text content to be read).

Referring to FIG. 9C, following the example of FIG. 9B, assuming that the currently triggered target point TP9(3) appears in the content region 912, the processor 110 may identify the content region 912 to which the target point TP9(3) belongs as the target content region, and the separation line SL3 for separating the target content region 912 and the adjacent content region 913 is set as the target separation line TSL9.2 (text content in the adjacent content region 913 is determined as the text content to be read). In addition, after setting another target separation line TSL9.2, the original target separation line TSL9.1 will become a general separation line SL2. That is, in response to the preset separation pattern being the first separation pattern and the identified triggered target point being moved from the target content region (e.g., content region 911) to the adjacent content region (e.g., content region 912), the adjacent content region is identified as a new target content region (e.g., content region 912), and the separation line SL3 between the adjacent content region 912 and another further adjacent content region 913 is set as a new target separation line TSL9.2 to replace the old target separation line TSL9.1, wherein the identified new target region TR and the new one or more non-target regions NTR are adjusted according to the new target separation line (as shown in FIG. 9C, the blocked non-target region NTR is adjusted according to the target separation line TSL9.2). In other words, the display method provided in this embodiment can allow the masked non-target region and the not-masked target region be adjusted while the target point triggered by the user moves line by line in the multi-line text content, such that the user can have the visual experience of reading line by line.

It should be noted that the second and third separation patterns can also adjust the masked/covered non-target region and the target region not being masked when the target point triggered by the user moves line-by-line among the multi-line text content, so as to let the user to have a line-by-line reading experience.

Referring to FIG. 2, in step S230, the processor 110 identifies, according to an identified preset covering pattern, a target region and one or more non-target regions other than the target region of the image based on the target separation line. Next, in step S240, the processor 110 adjusts the one or more non-target regions to decrease a readability of the one or more non-target regions.

Specifically, in the embodiment, the preset covering pattern includes one of the following patterns: (1) a first covering pattern; (2) a second covering pattern; (3) The third covering pattern; and (4) The fourth covering pattern.

In more detail, in response to identifying that the preset covering pattern is the first covering pattern, the step of identifying, by the processor 110, the target region and the one or more non-target regions other than the target region of the image based on the target separation line includes: identifying a region above the target separation line in the image is the target region; and identifying a region under the target separation line in the image is the non-target region.

Furthermore, in response to identifying that the preset covering pattern is the second covering pattern, the step of identifying, by the processor 110, the target region and the one or more non-target regions other than the target region of the image based on the target separation line includes: identifying a region under the target separation line in the image is the target region; and identifying a region above the target separation line in the image is the non-target region.

Moreover, in response to identifying that the preset covering pattern is the third covering pattern, the step of identifying, by the processor 110, the target region and the one or more non-target regions other than the target region of the image based on the target separation line includes: identifying a region on the right of the target separation line in the image is the target region; and identifying a region on the left of the target separation line in the image is the non-target region.

In addition, in response to identifying that the preset covering pattern is the fourth covering pattern, the step of identifying, by the processor 110, the target region and the one or more non-target regions other than the target region of the image based on the target separation line includes: identifying a region on the left of the target separation line in the image is the target region; and identifying a region on the right of the target separation line in the image is the non-target region.

For example, referring to FIG. 9B, according to the preset covering pattern that is the first covering pattern, the region above the target separation line TSL9.1 is identified as the target region TR (e.g., content region 911), the target region below the target separation line TSL9.1 is identified as non-target region(s) NTR (e.g., content regions 912, 913), and the processor 110 adjusts the non-target region NTR (e.g., performs a covering operation) to reduce the readability of the text content in the non-target region NTR.

For another example, referring to FIG. 9C, according to the preset covering pattern that is the first covering pattern, the region above the target separation line TSL9.2 is identified as the target region TR (e.g., content regions 911, 912), the region below the target separation line TSL9.2 is identified as a non-target region NTR (e.g., content region 913), and the processor 110 adjusts the non-target region NTR (e.g., performs a covering operation) to reduce the readability of the text content in the non-target region NTR.

In the embodiment, the step of adjusting the one or more non-target regions to decrease a readability of the one or more non-target regions comprises one of a plurality of steps below: (1) decreasing a brightness of the one or more non-target regions (e.g., as illustrated by FIG. 3C); (2) using a translucent color block to cover the one or more non-target regions (e.g., as illustrated by FIG. 3C); (3) using an opaque color block to cover the one or more non-target regions (e.g., as illustrated by FIG. 6A); and (4) using an information content to cover the non-target regions (e.g., as illustrated by FIG. 6B).

Figure 6B:
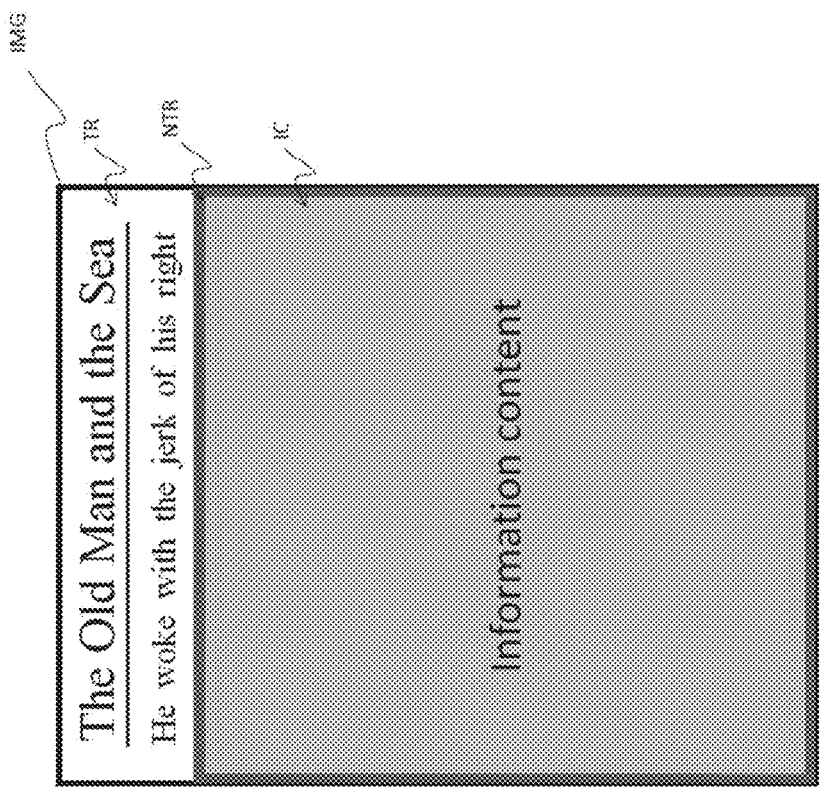
FIG. 6B is a schematic diagram of covering a non-target region according to a further embodiment of the invention.
Figure 6A:
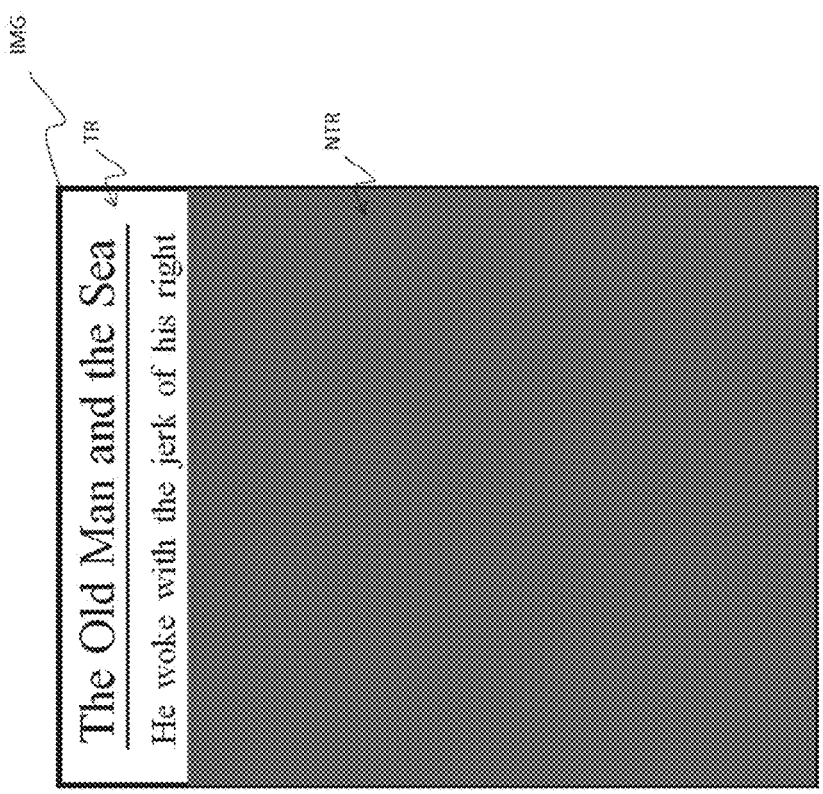
FIG. 6A is a schematic diagram of covering a non-target region according to an embodiment of the invention.

FIG. 6A is a schematic diagram of covering a non-target region according to an embodiment of the invention. For example, referring to FIG. 6A, after identifying the non-target region NTR, the processor 110 may use an opaque dark gray color block to cover the non-target region NTR to reduce the readability of the non-target region NTR. In this example, the user will not see the text content originally displayed in the non-target region NTR.

FIG. 6B is a schematic diagram of covering a non-target region according to a further embodiment of the invention. For example, referring to FIG. 6B, after identifying the non-target region NTR, the processor 110 may use the information content block IC to cover the non-target region NTR to reduce the readability of the text content originally displayed in the non-target region NTR, and display other information content in the information content block IC. In this example, the user will not see the text content originally displayed in the non-target region NTR, but the user can see the information content. The information content includes but is not limited to one of the following content: (1) image; (2) other text; (3) advertising content; (4) image/interface of other application.

Please return to FIG. 3C again, assuming that the processor 110 identifies that the preset separation pattern is the first separation pattern and identifies that the preset covering pattern is the first covering pattern. First, the processor 110 can identify the target location TL of the target point TP in the image IMG (step S210), correspondingly set the target separation line TSL according to the identified first separation pattern (step S220), and identify, according to the first separation pattern, the target region TR and the non-target region NTR in the image IMG based on the target separation line TSL (step S230). Next, as indicated by arrow A31, after identifying the non-target region NTR, the processor 110 further adjusts the readability of the non-target region NTR (step S240) (e.g., using a translucent dark color block to cover the non-target region NTR).

Figure 3D:
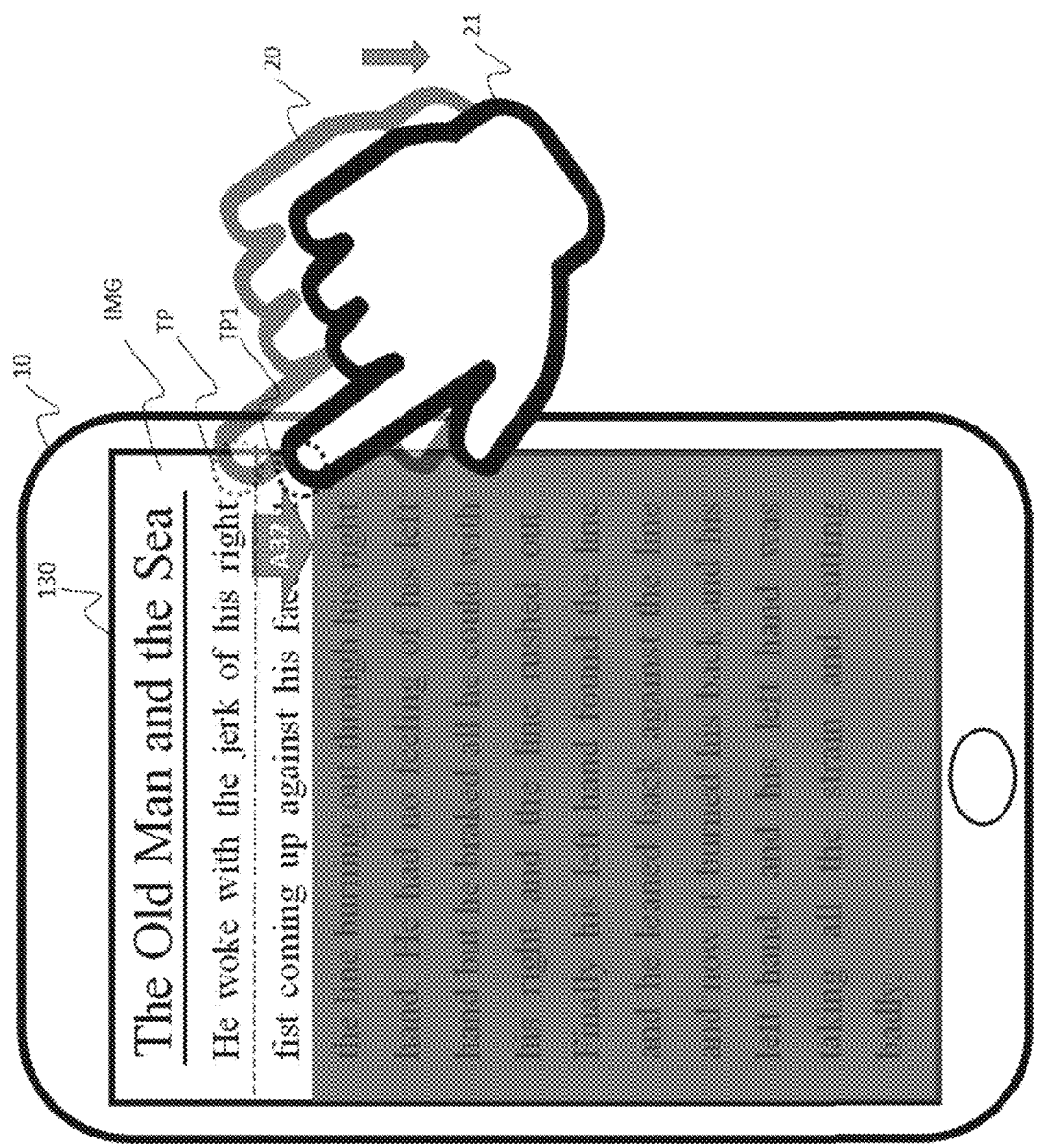
FIGS. 3D to 3E are schematic diagrams of adjusting the readabilities of different non-target regions based on different target points according to an embodiment of the invention.
Figure 3E:
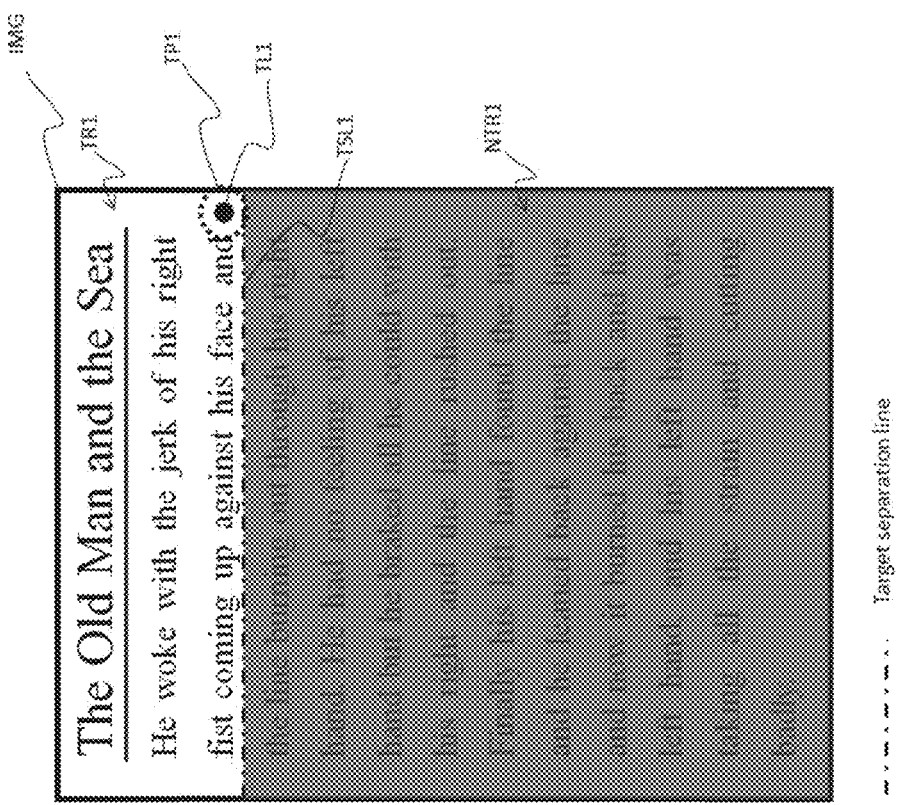
Figure 3E:
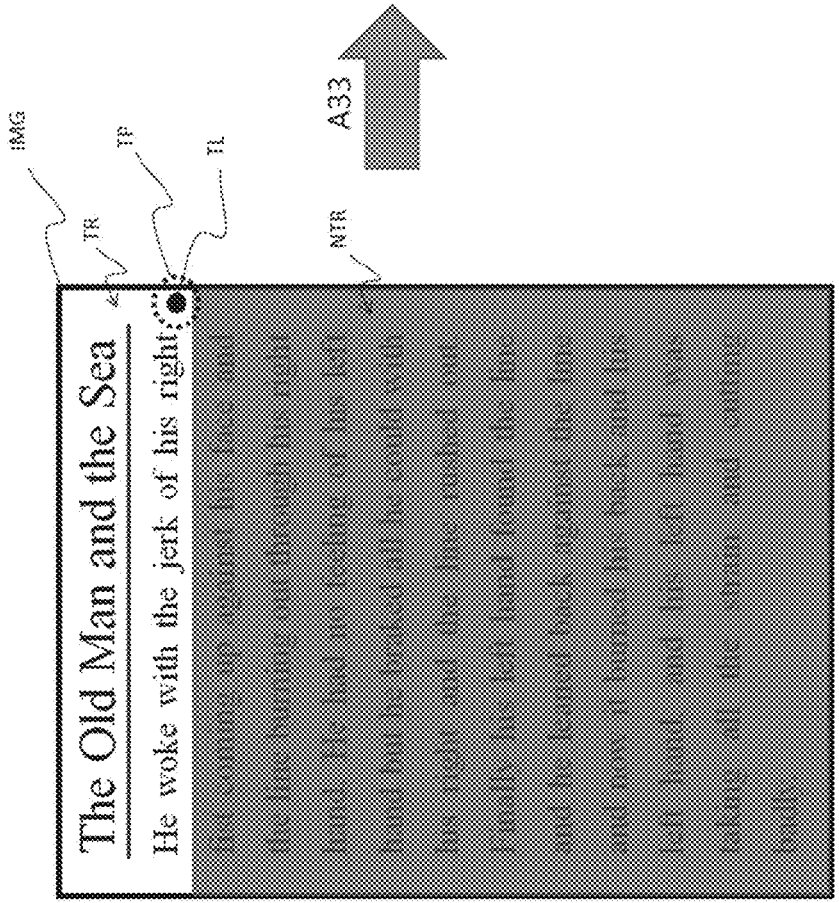

FIG. 3D to 3E are schematic diagrams of adjusting the readabilities of different non-target regions based on different target points according to an embodiment of the invention. Please refer to FIGS. 3D and 3E, assuming that, as shown by arrow A32, while the user's hand moves from the position of the hand 20 to the position of the hand 21, the triggered target point TP corresponding to the touch screen 130 is also moved to the target point TP1, the target location TL also changes to the target position TL1 correspondingly. Please refer to FIG. 3E, as shown by the arrow A33, according to the change of the target location, the set target separation line TSL is changed to the target separation line TSL1, the identified target region TR will be changed to the target region TR1, and the non-target region NTR being performed the covering operation will also be changed to the non-target region NTR1. In other words, since the processor 110 continuously identifies the target location of the triggered target point, the non-target region where the covering operation is performed may also be changed correspondingly according to the change of the target location.

Figure 3F:
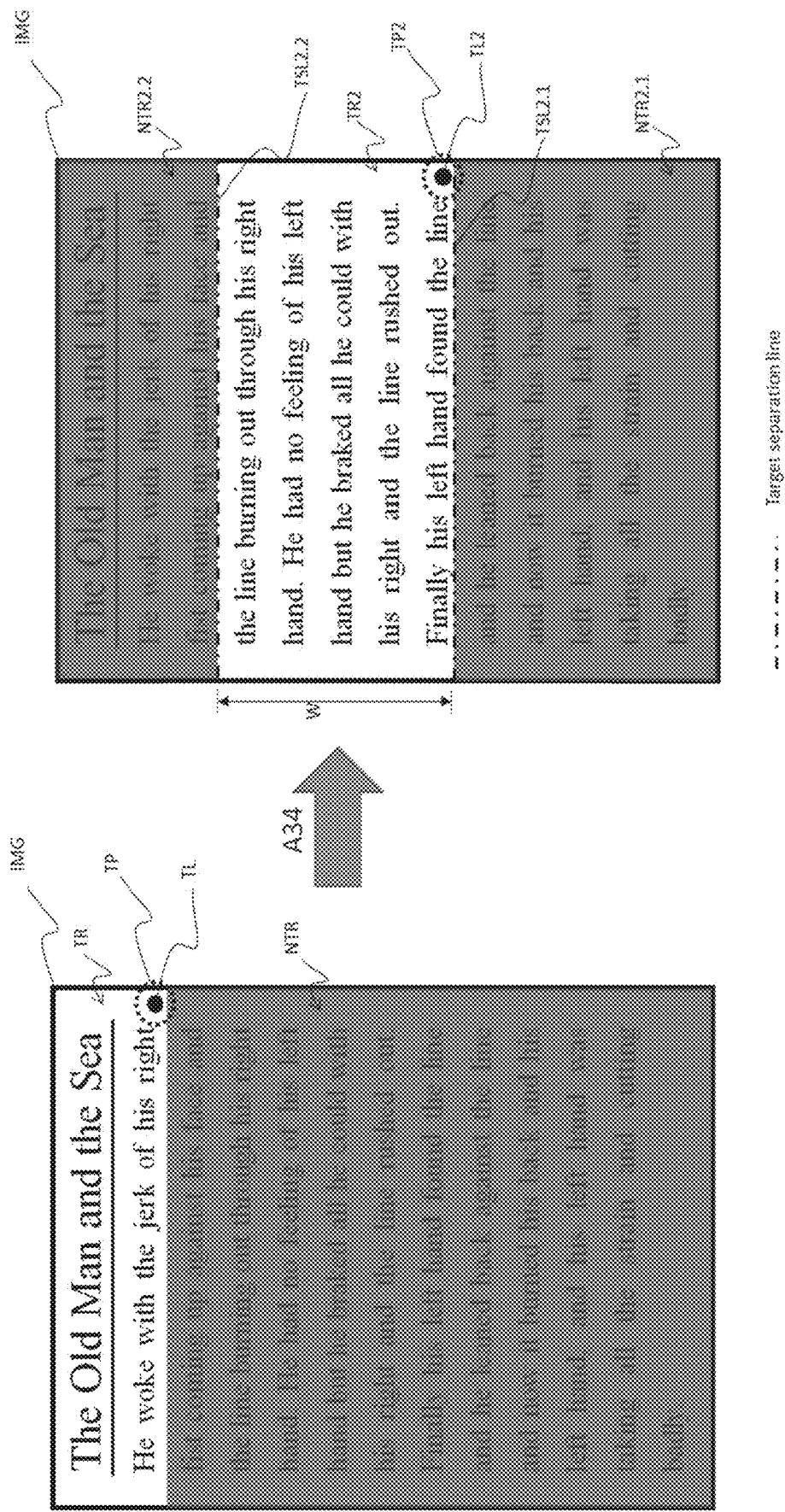
FIG. 3F is a schematic diagram of adjusting the readabilities of a plurality of non-target regions according to an embodiment of the invention.

FIG. 3F is a schematic diagram of adjusting the readabilities of a plurality of non-target regions according to an embodiment of the invention. Please refer to FIG. 3F, in this embodiment, the width of the target region has a limitation by the maximum width value W. For example, as indicated by arrow A34, when the target point changes from the target location TL to the target location TL2, the processor 110 may determine that the width from the target separation line TSL2.1 up to the upper edge of the image IMG exceeds the maximum width value W, and the processor 110 may set another target separation line TSL2.2 on the target separation line TSL2.1 according to the maximum width value W. Next, the processor 110 identifies the region between the target separation line TSL2.1 and the target separation line TSL2.2 as the target region TR2, identifies the region under the target separation line TSL2.1 as the non-target region NTR2.1, and identifies the region above the separation line TSL2.2 is the non-target region NTR2.2.

Figure 4B:
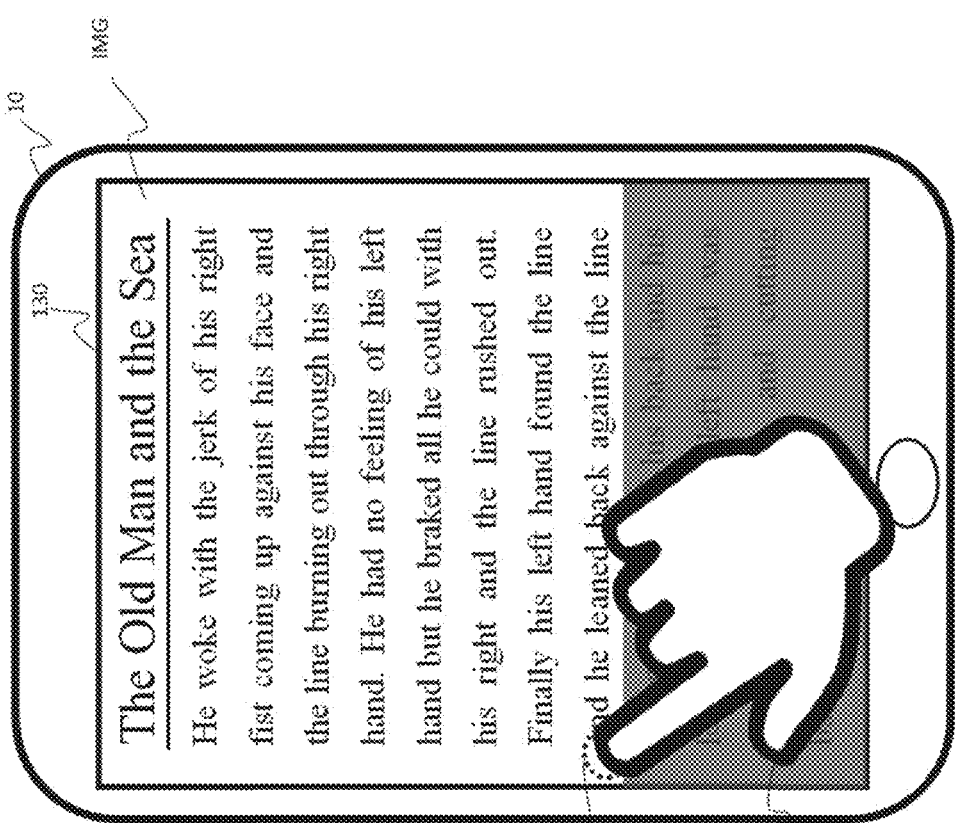
FIGS. 4A to 4B are schematic diagram illustrating different triggered target points of different locations according to an embodiment of the invention.
Figure 4A:
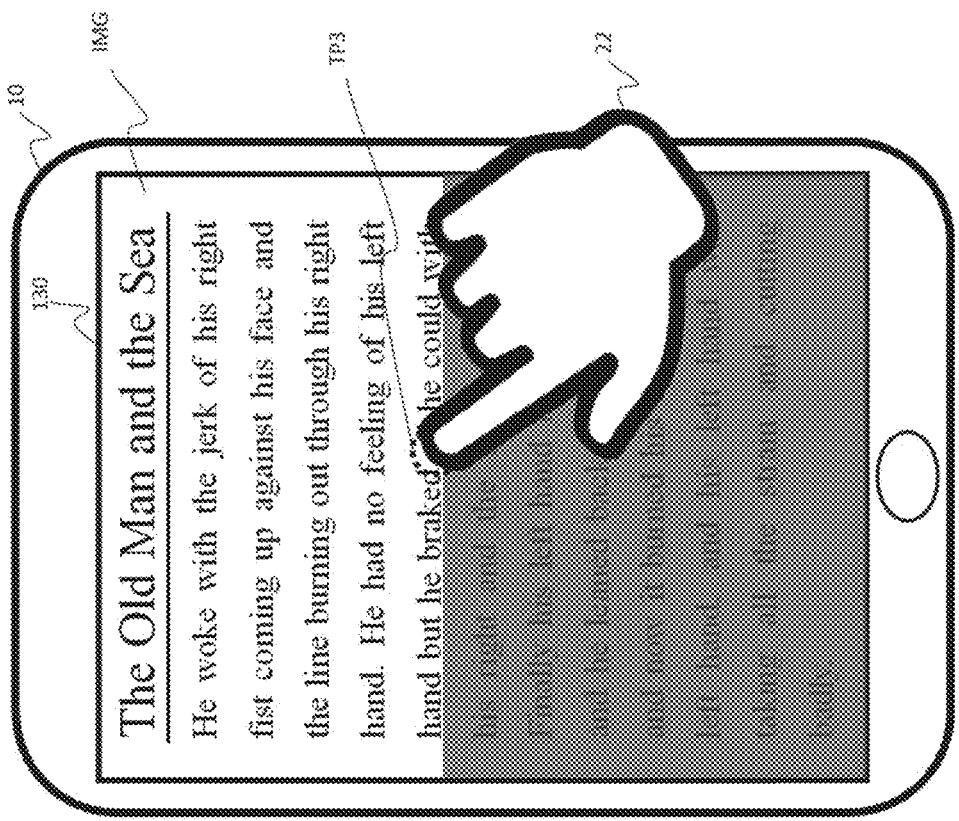

FIG. 4A to 4B are schematic diagram illustrating different triggered target points of different locations according to an embodiment of the invention. It is worth mentioning that, in the above embodiments, the triggered target points are all located on the right side of the screen IMG, but the invention is not limited thereto. For example, referring to FIGS. 4A to 4B, the triggered target point may appear anywhere on the image IMG according to the input operation applied to the I/O device 130. For example, the target point TP3 triggered by the input operation applied by the hand 22 in the middle of the image IMG shown in FIG. 4A. For another example, the target point TP4 triggered by the input operation applied by the hand 23 on the left side of the image IMG shown in FIG. 4B.

Figure 5:
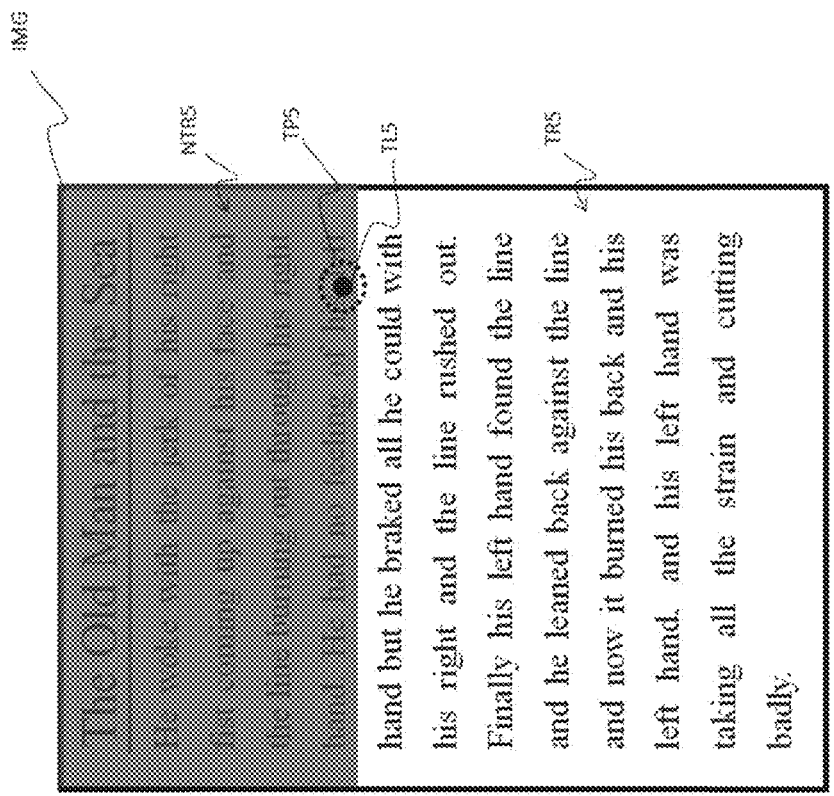
FIG. 5 is a schematic diagram of identifying a non-target region and adjusting the readability of the non-target region according to an embodiment of the invention.
Figure 5:
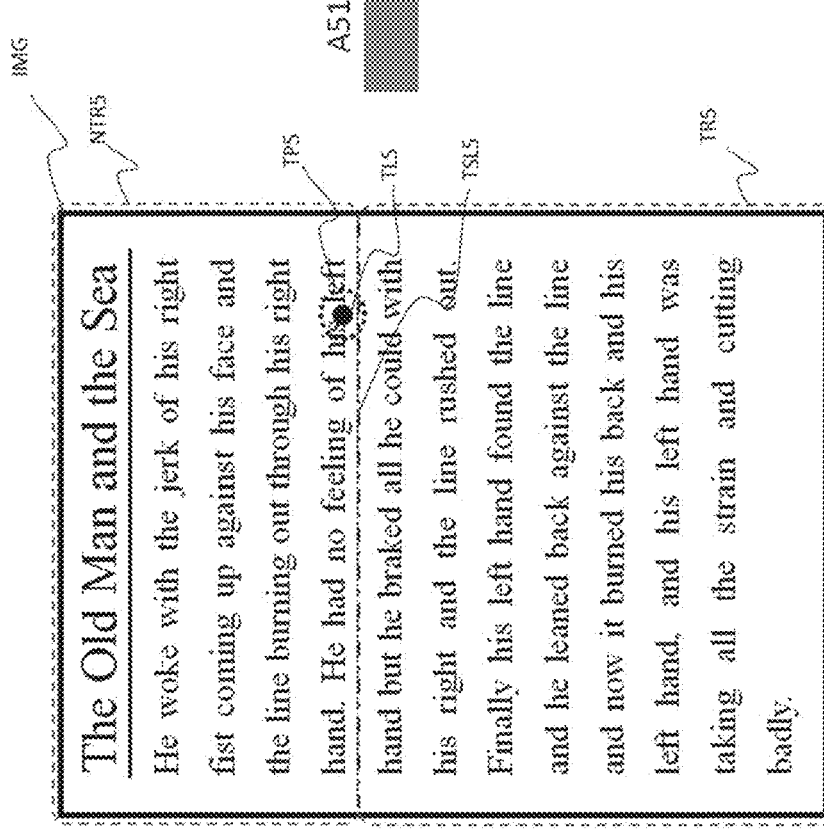

FIG. 5 is a schematic diagram of identifying a non-target region and adjusting the readability of the non-target region according to an embodiment of the invention. Please refer to FIG. 5. For example, assume that the processor 110 identifies that the preset separation pattern is the first separation pattern and identifies the preset covering pattern is the second covering pattern. First, the processor 110 can identify the target location TL5 of the target point TP5 in the image IMG (step S210), correspondingly set the target separation line TSLS according to the identified first separation pattern (step S220), and identify, according to the identified second covering pattern, the target region TR5 and the non-target region NTRS in the image IMG based on the target separation line TSLS (step S230) (the region above the target separation line TSLS is identified as the non-target region). Next, as indicated by arrow A51, after identifying the non-target region NTRS, the processor 110 further adjusts the readability of the non-target region NTRS (step S240) (e.g., using a translucent dark color block to cover the non-target region NTRS).

Figure 7:
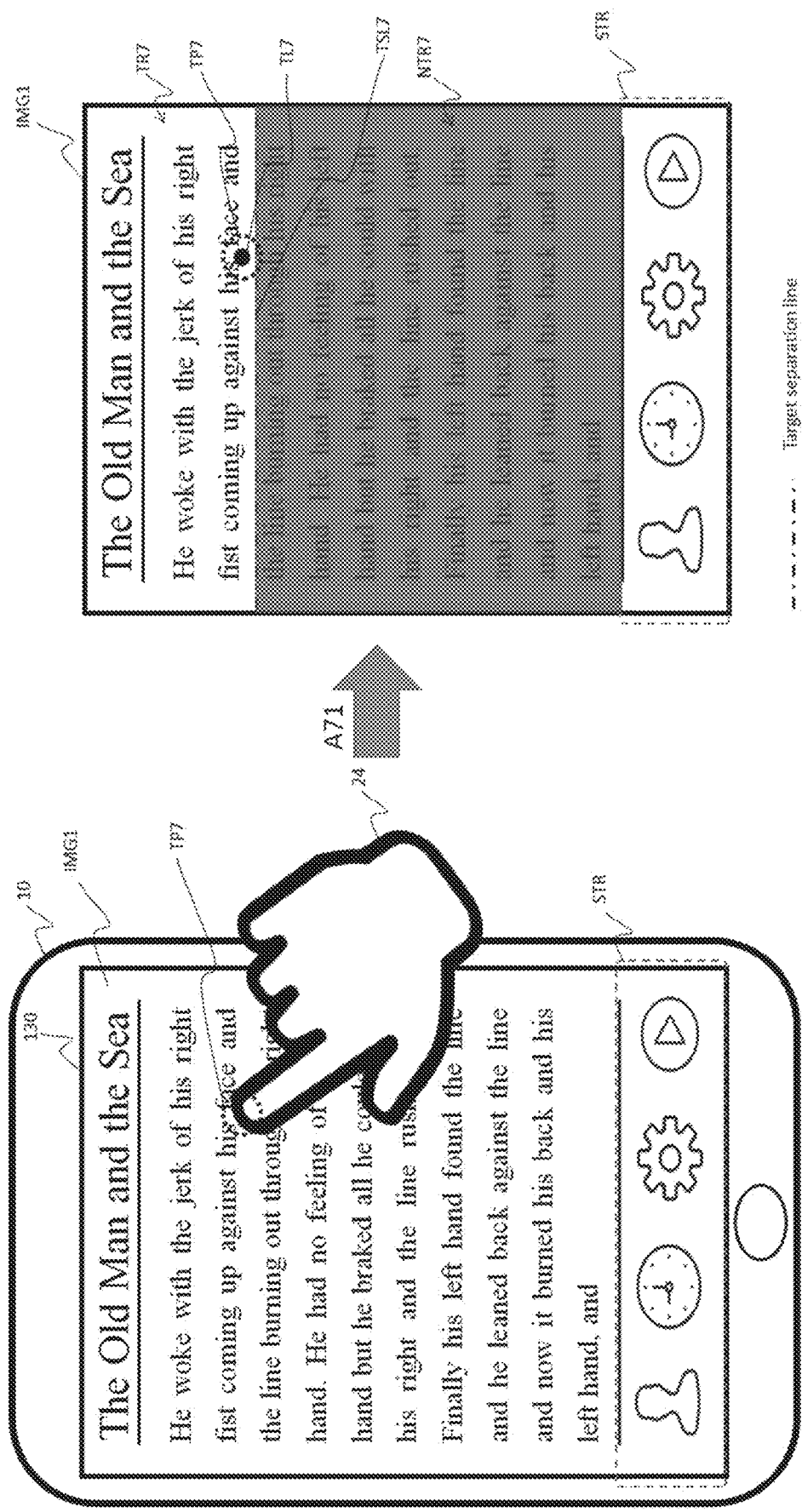
FIG. 7 is a schematic diagram of not covering a special target region according to an embodiment of the invention.

FIG. 7 is a schematic diagram of not covering a special target region according to an embodiment of the invention. For example, assume that the processor 110 identifies that the preset separation pattern is the first separation pattern and identifies that the preset covering pattern is the first covering pattern. In addition, it is assumed that the image IMG1 displayed by the I/O device 130 includes the special target region STR. The special target region STR is, for example, a function bar (interface) of an application program or a default function interface of the electronic device 10. In this example, the processor 110 may identify the target location TL7 of the target point TP7 in the image IMG1 (step S210), correspondingly set the target separation line TSL7 according to the identified first separation pattern (step S220), and identify, according to the first covering pattern, the target region TR7 and the non-target region NTR7 in the image IMG1 based on the target separation line TSL7 (step S230)(The region of the non-special target region STR below the target separation line TSL7 is the non-target region). That is, in this example, the non-target region NTR7 does not include the special target region STR. Next, as indicated by arrow A71, after identifying the non-target region NTR7, the processor 110 further adjusts the readability of the non-target region NTR7 (step S240) (e.g., using a translucent dark color block to cover the non-target region NTR7).

Figure 8A:
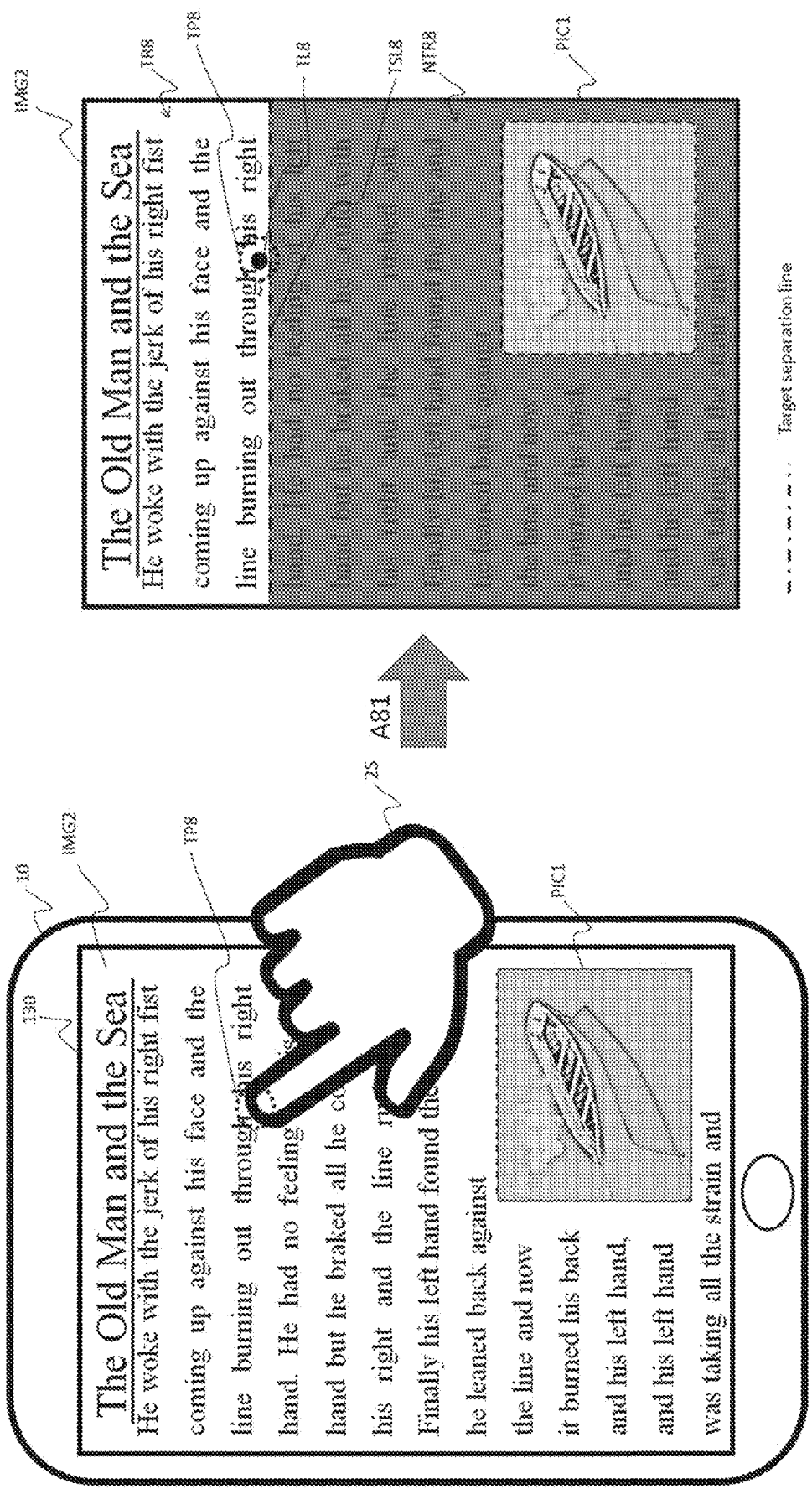
FIG. 8A is a schematic diagram of not covering a picture in an image according to an embodiment of the invention.

FIG. 8A is a schematic diagram of not covering a picture in an image according to an embodiment of the invention. Referring to FIG. 8A, it is assumed that the processor 110 identifies that the preset separation pattern as the first separation pattern and identifies that the preset covering pattern as the first covering pattern. In addition, it is assumed that the image IMG2 displayed by the I/O device 130 includes the picture PIC1 in addition to the text content. In this example, the processor 110 may identify the target location TL8 of the target point TP8 in the image IMG2 (step S210), correspondingly set the target separation line TSL8 according to the identified first separation pattern (step S220), and identify, according to the identified first covering pattern, the target region TR8 and the non-target region NTR8 in the image IMG2 based on the target separation line TSL8 (step S230) (The region below the target separation line TSL8 that does not include the picture PIC1 is the non-target region). Next, as indicated by arrow A81, after identifying the non-target region NTR8, the processor 110 further adjusts the readability of the non-target region NTR8 (step S240) (e.g., using a translucent dark color block to cover the non-target region NTR8). It should be noted that, in this example, the picture PIC1 is not covered by the translucent dark color block, but the present invention is not limited to this. For example, in another embodiment, the picture PIC1 may also be covered.

Figure 8B:
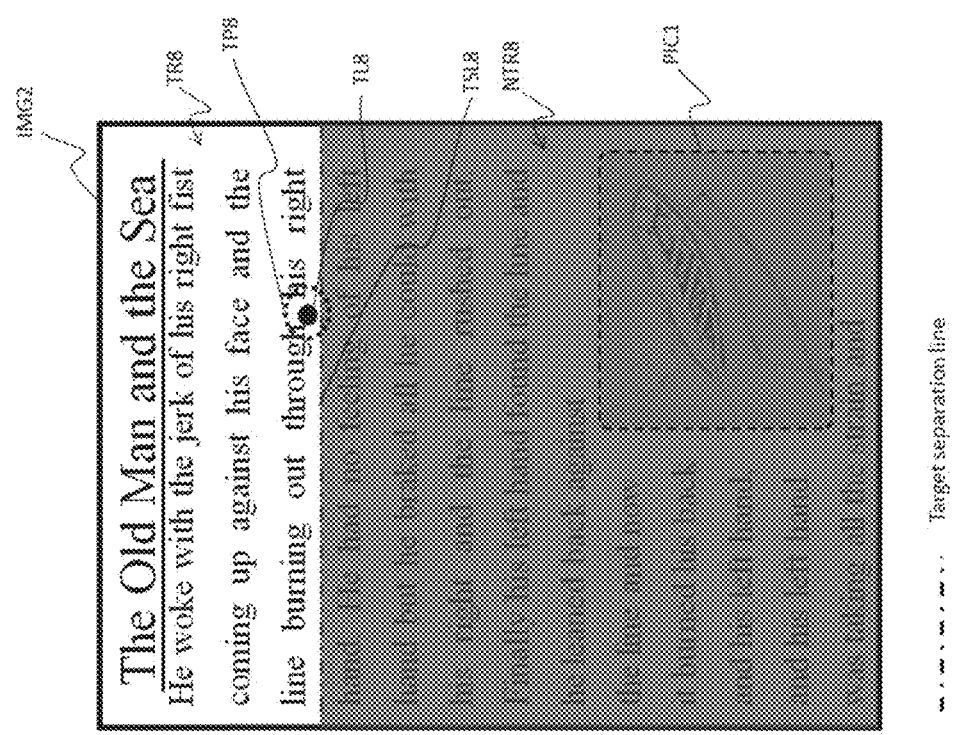
FIG. 8B is a schematic diagram of covering a picture in an image according to an embodiment of the invention.
Figure 8B:
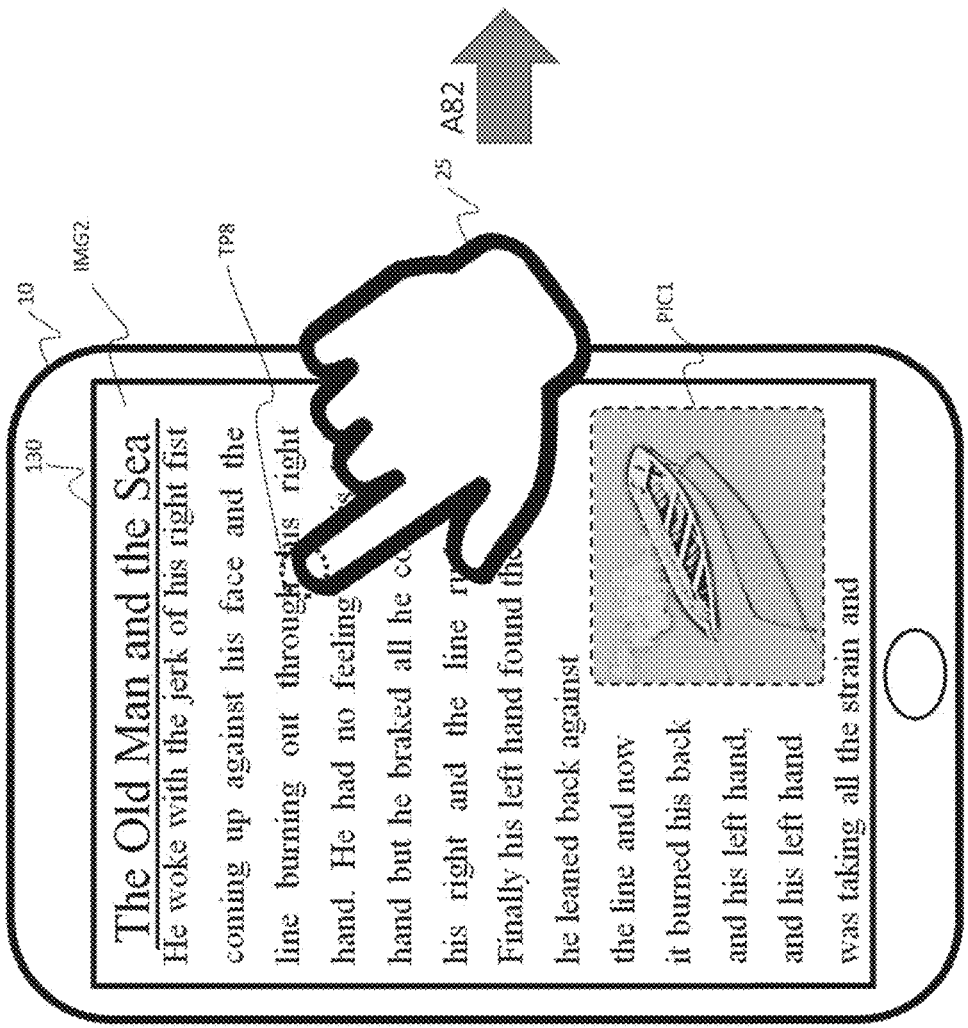

FIG. 8B is a schematic diagram of covering a picture in an image according to an embodiment of the invention. Please refer to FIG. 8B, which is similar to FIG. 8A. In this example, the processor 110 can identify the target location TL8 of the target point TP8 in the image IMG2 (step S210), and set accordingly, according to the identified first separation pattern, the target dividing line TSL8 (step S220), and identify, according to the target first separation pattern, the target region TR8 and the non-target region NTR8 in the image IMG2 based on the target separation line TSL8 (step S230) (The region under the target separation line TSL8 is the non-target region). Next, as indicated by arrow A82, after identifying the non-target region NTR8, the processor 110 further adjusts the readability of the non-target region NTR8 (step S240) (e.g., using a translucent dark color block to cover the non-target region NTR8). It should be noted that, in this embodiment, the picture PIC1 is contained in the non-target region NTR8 and will be covered by the translucent dark color block. In the above embodiment, the preset separation pattern is the first separation pattern. The following uses FIG. 10A to FIG. 10B to describe an example when the preset separation pattern is the second separation pattern.

Figure 10A:
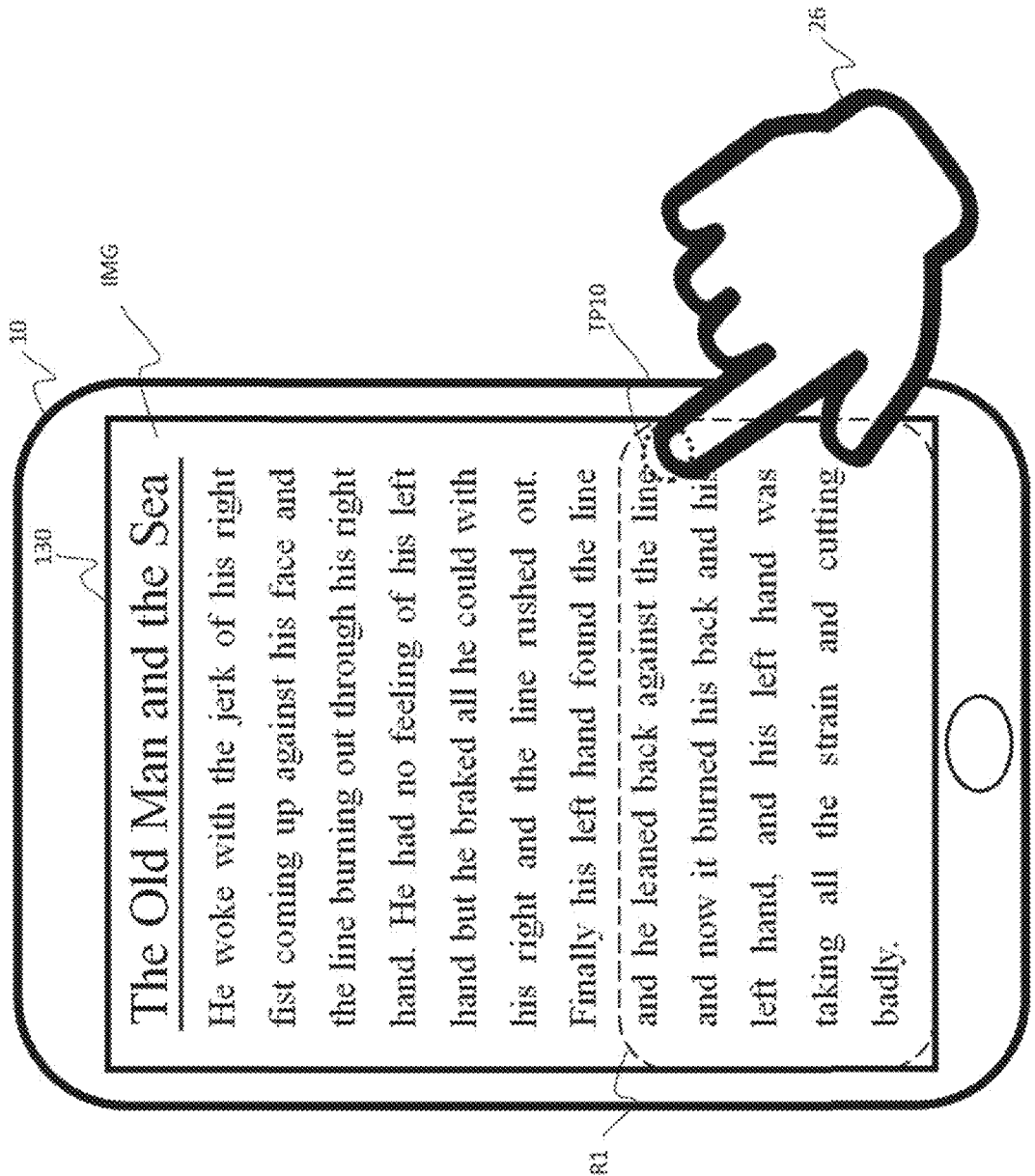
FIGS. 10A to 10B are schematic diagrams of setting a target separation line and correspondingly identifying a target region and a non-target region according to a further embodiment of the invention.
Figure 10B:
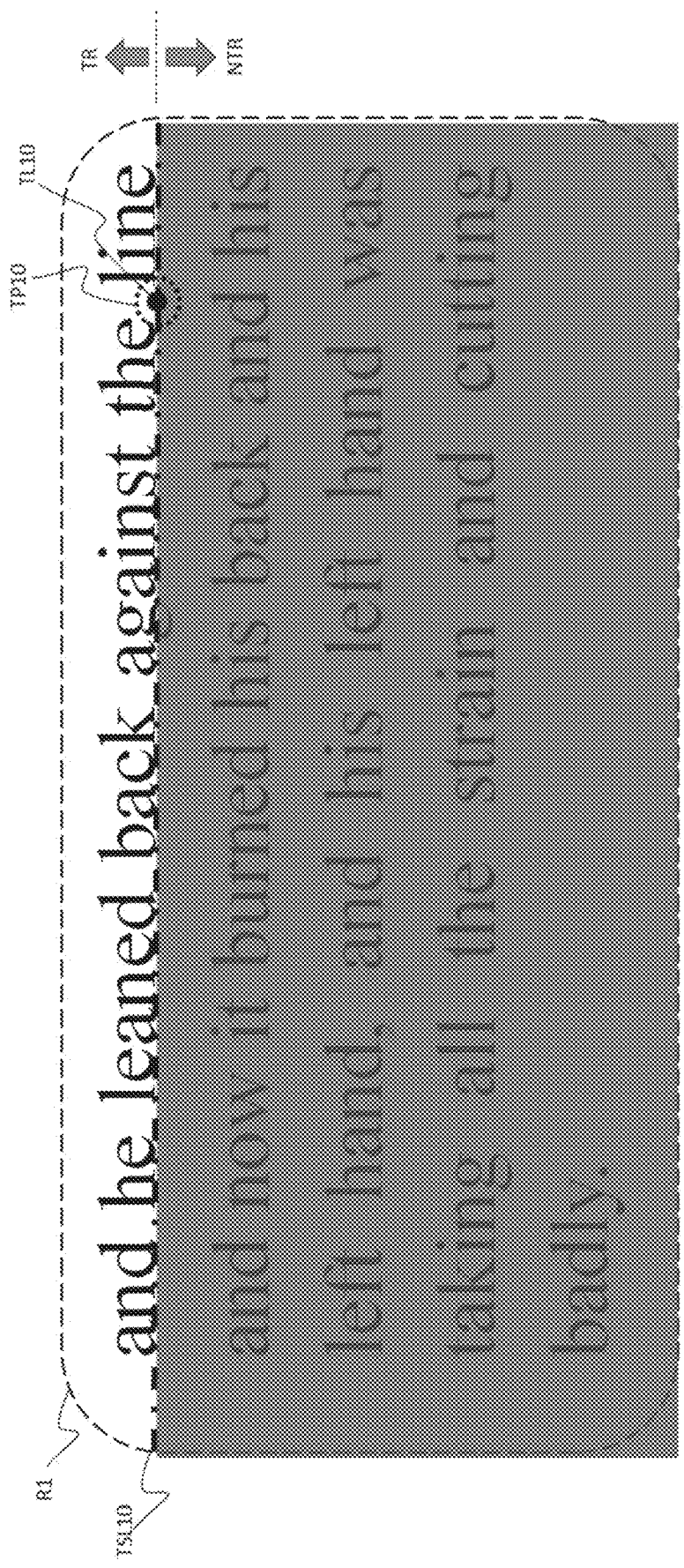

FIG. 10A to 10B are schematic diagrams of setting a target separation line and correspondingly identifying a target region and a non-target region according to a further embodiment of the invention. Please refer to FIG. 10A, for example, assume that the processor 110 identifies that the preset separation pattern is the second separation pattern and identifies that that the preset covering pattern is the first covering pattern. In addition, it is assumed that the input operation applied by the user via the hand 26 triggers the target point TP10 in the region R1 in the screen IMG via the I/O device 130. Please refer to FIG. 10B, in this example, the processor 110 can identify the target location TL10 of the target point TP10 in the image IMG (step S210). Then, in response to identifying that the preset separation pattern is the second separation pattern, the processor 110 sets, according to the target location TL10, a virtual horizontal line on the target location TL10 to become the target separation line TSL10 (Step S220).

Next, the processor 110 identifies the target region and the non-target region in the image IMG based on the identified first covering pattern based on the target separation line TSL10 (step S230) (the region under the target separation line TSL10 is The non-target region). Then, after identifying the non-target region, the processor 110 further adjusts the readability of the non-target region (step S240) (for example, covering the non-target region with a translucent dark color block).

Figure 11A:
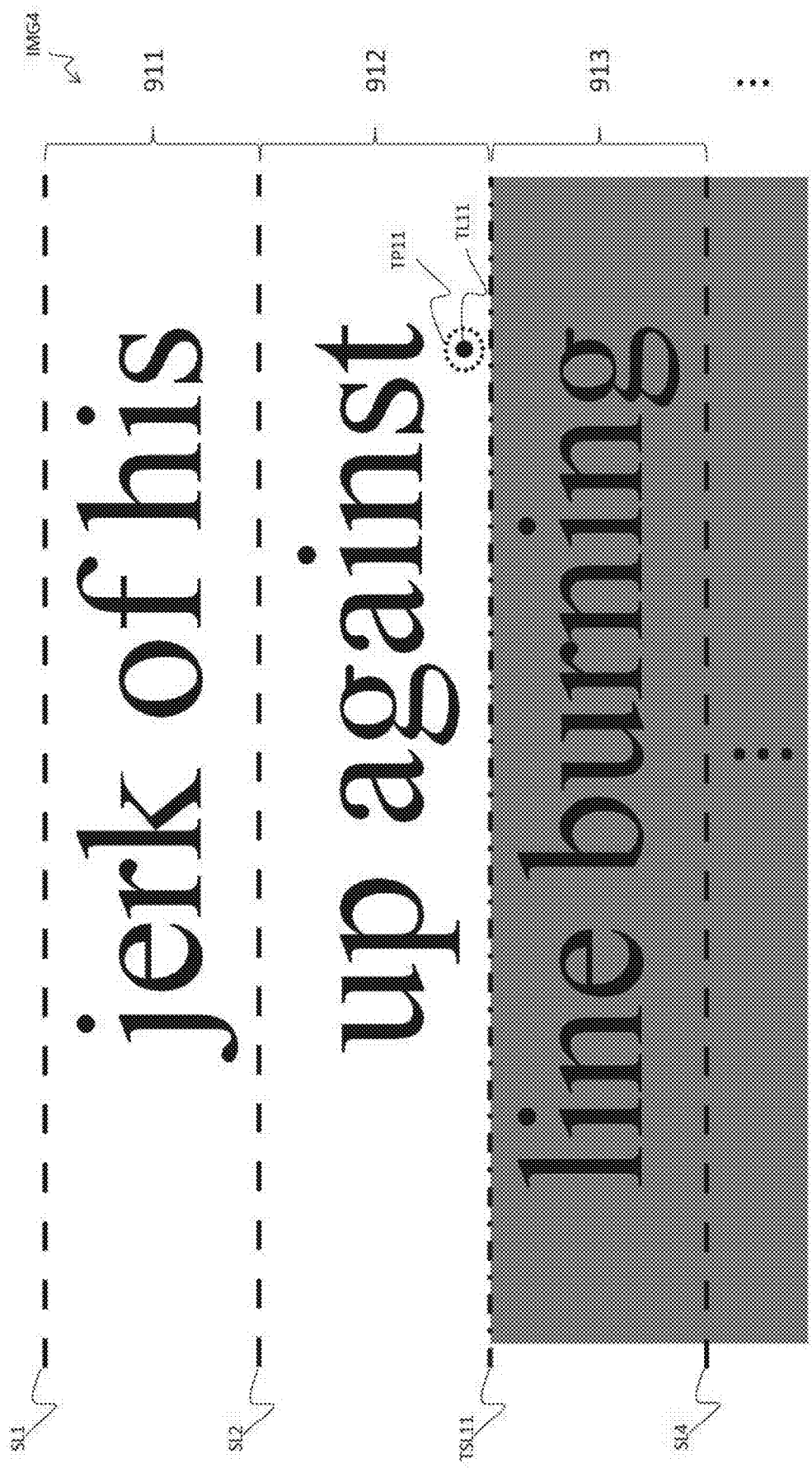
FIGS. 11A to 11B are schematic diagrams of disposing a mark corresponding to a target point in an image according to an embodiment of the invention.
Figure 11B:
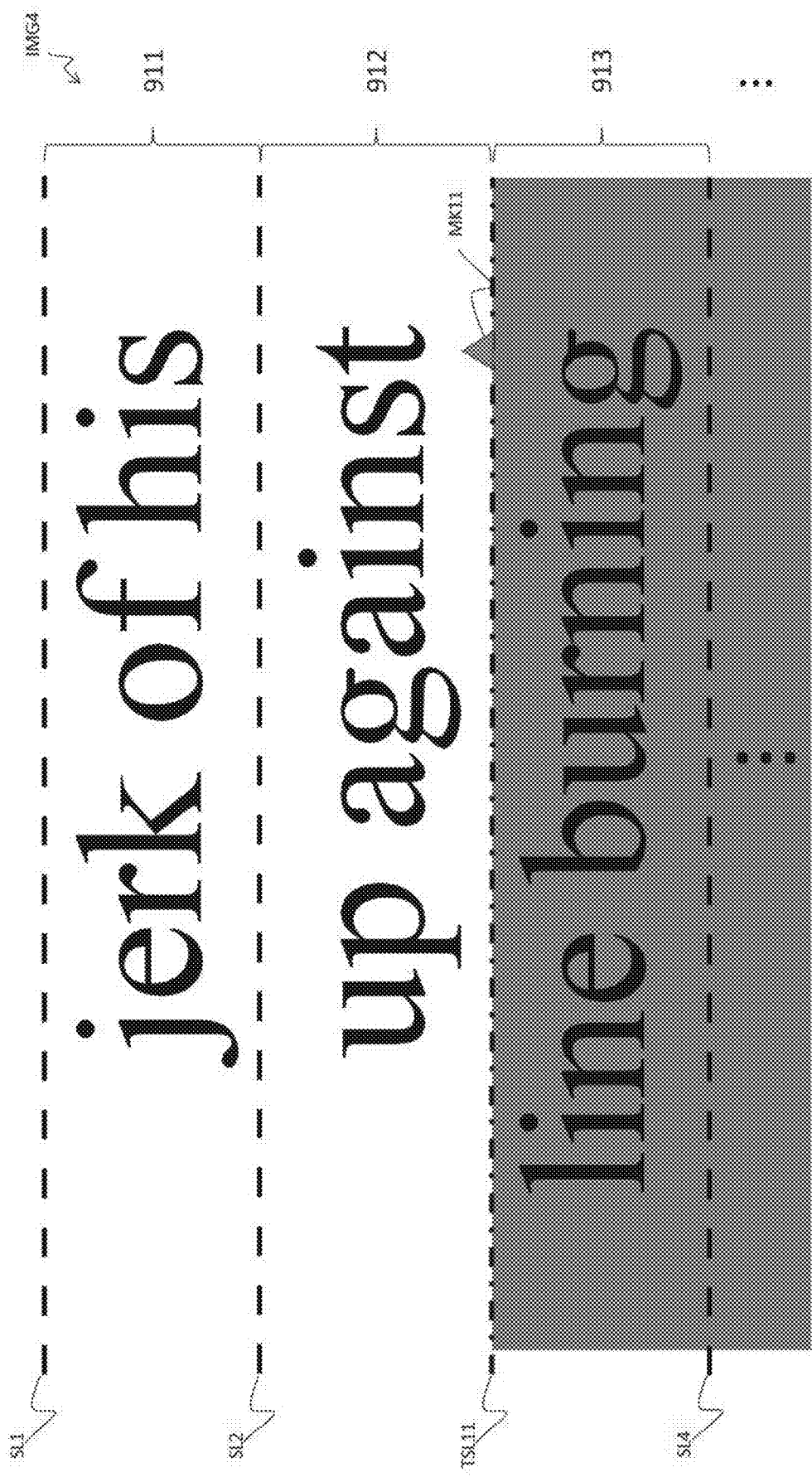

FIG. 11A to 11B are schematic diagrams of disposing a mark corresponding to a target point in an image according to an embodiment of the invention. Please refer to FIG. 11A, the image IMG4 in FIG. 11A is similar to the image IMG3 in FIG. 9A. For example, assume that the processor 110 identifies that the preset separation pattern is the first separation pattern and identifies that the preset covering pattern as the first covering pattern. In addition, assuming that the target point TP11 has been triggered on the image IMG4, the processor 110 has identified the target location TL11 corresponding to the target point TP11 and set the target separation line TSL11. Referring to FIG. 11B, following the example of FIG. 11A, the processor 110 further sets a mark MK11 on the target separation line TSL11 according to the target location TL11. In this way, the user can more clearly recognize the position of the target point TP11 pointed/touched by the user currently.

In the above example, the multiple-line text content in the displayed image is in the form of horizontal arrangement, and the processor 110 may use the first separation pattern or the second separation pattern to set the target separation line, and use the first covering pattern and the second covering pattern to cover non-target regions above or below the target separation line. However, the present invention is not limited hereto. For example, in other embodiments, in response to the multiple-line text content in the image is in the form of vertical arrangement, and the processor 110 may use a first separation pattern (the text content of each line may be divided into a content region, and the target separation line is the separation line between the target content region to which the target point belongs and the content region on the left or right of the target content region) or a third separation pattern to set the target separation line, and use the third covering pattern and the fourth covering pattern to cover the non-target region on the left or right of the target separation line.

Figure 12A:
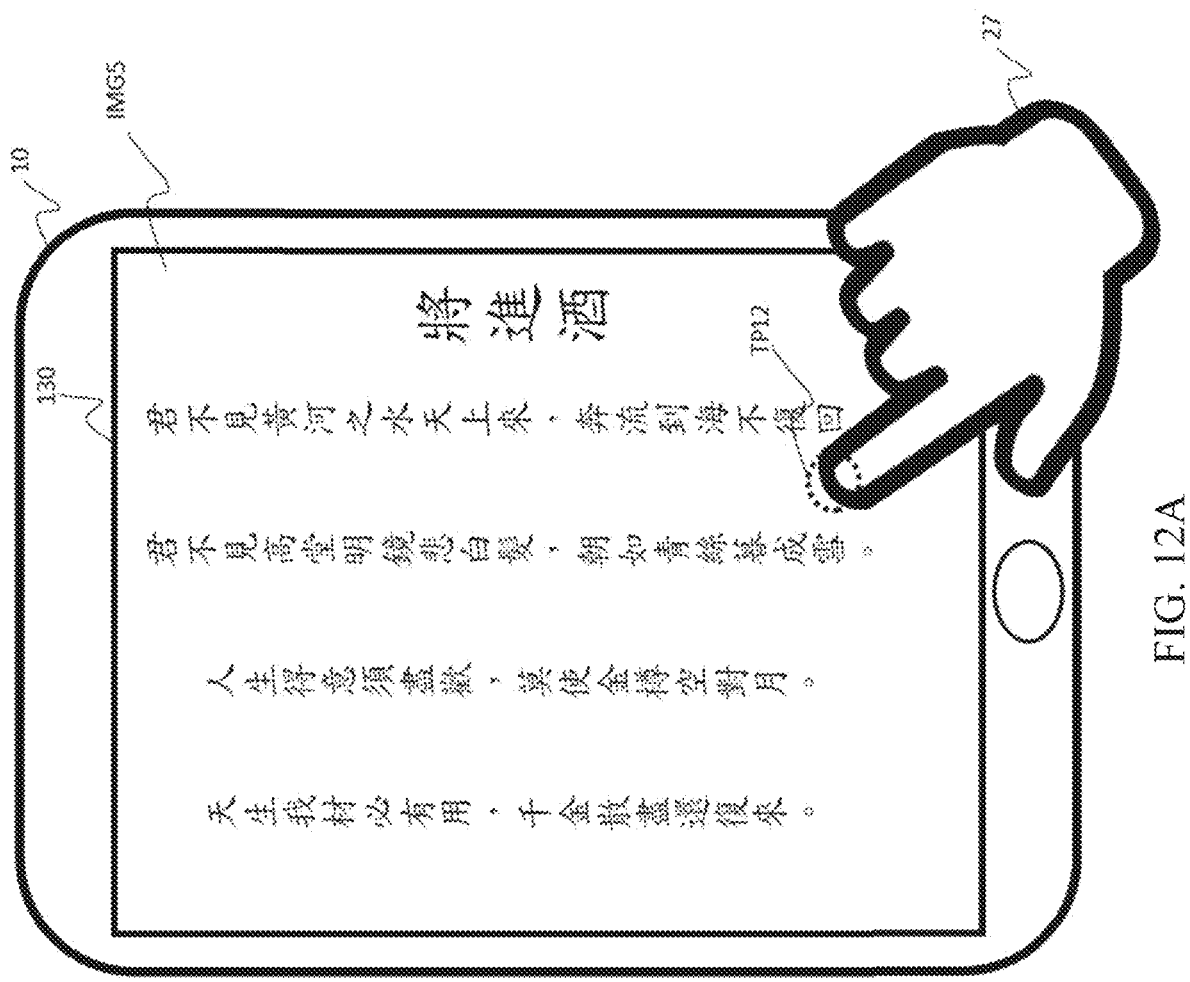
FIGS. 12A to 12C are schematic diagrams of identifying a non-target region and adjusting the readability of the non-target region according to an embodiment of the invention.
Figure 12C:
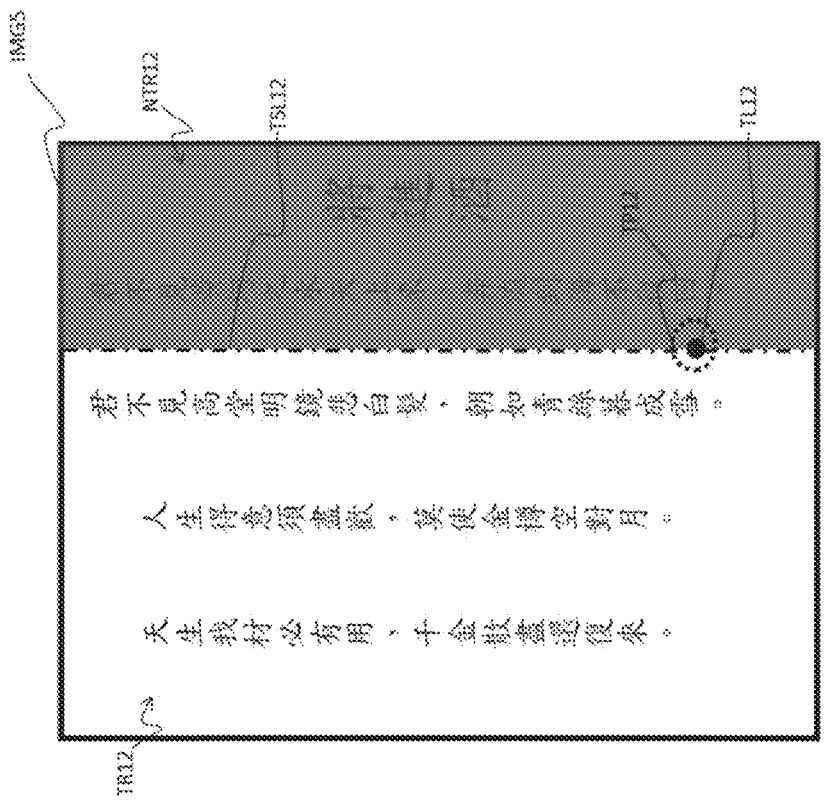
Figure 12B:
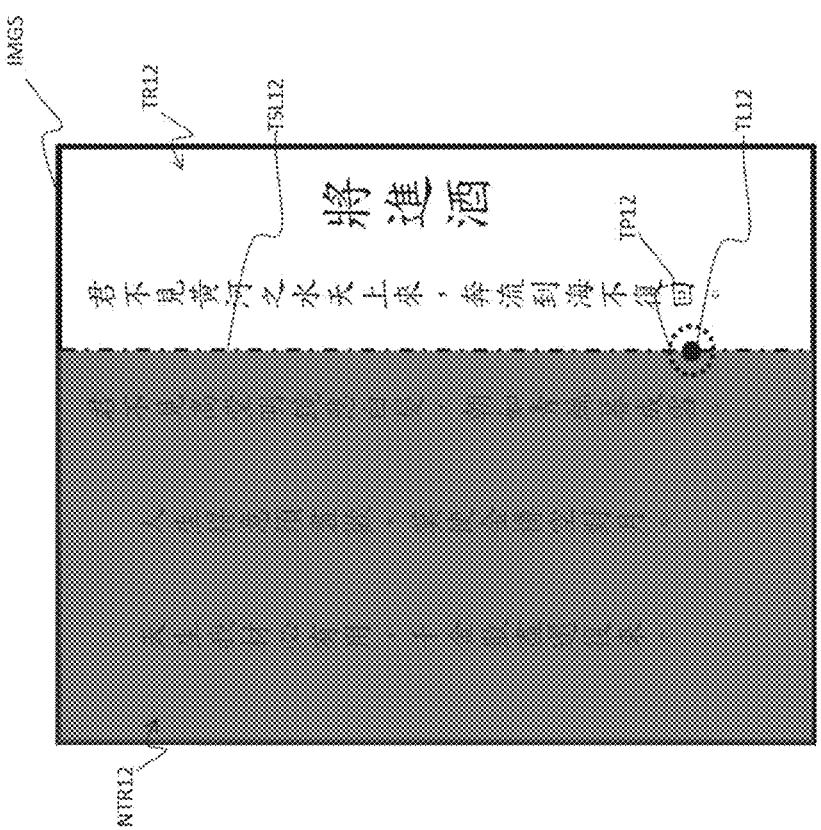

FIG. 12A to 12C are schematic diagrams of identifying a non-target region and adjusting the readability of the non-target region according to an embodiment of the invention. Referring to FIG. 12A, for example, assume that the image IMG5 displayed by the I/O device 130 of the electronic device 10 includes a plurality of lines of vertically arranged text content. In addition, it is assumed that the user's hand 27 has triggered the target point TP12 via an input operation applied to the I/O device 130.

Following the example of FIG. 12A, please refer to FIG. 12B, for example, assume that the processor 110 identifies that the preset separation pattern is a third separation pattern and that the preset covering pattern is a third covering pattern. In response to identifying that the preset covering aspect is the third masking aspect, the processor 110 may identify, according to the target separation line TSL12, the region on the right of the target separation line TSL12 in the image IMG5 as the target region TR12, and identify the region on the left of the target separation line TSL12 in the image IMG5 as the non-target region NTR12. Next, the processor 110 would perform a covering operation on the non-target region NTR12.

On the other hand, following the example of FIG. 12A, please refer to FIG. 12C. For example, assume that the processor 110 identifies that the preset separation pattern is the third separation pattern and that the preset covering pattern is the fourth covering pattern. In response to identifying that the preset covering pattern is the fourth covering pattern, the processor 110 may identify, according to the target separation line TSL12, the region on the left of the target separation line TSL12 in the picture IMG5 as the target region TR12, and identify the region on the right of the target separation line TSL12 in the image IMG5 as the non-target region NTR12. Next, the processor 110 performs a covering operation on the non-target region NTR12.

In the above embodiments, the triggered target point is detected through the touch screen 130 (e.g., the target point is triggered by the user touching the touch screen 130). However, the present invention is not limited hereto. Specifically, in addition to the touched point, the triggered target point may also be a point corresponding to the position of the mouse cursor in the image (as shown in FIG. 13A), or a target point, which is displayed in the image, triggered via the grip operation (as shown in FIG. 13B).

Figure 13B:
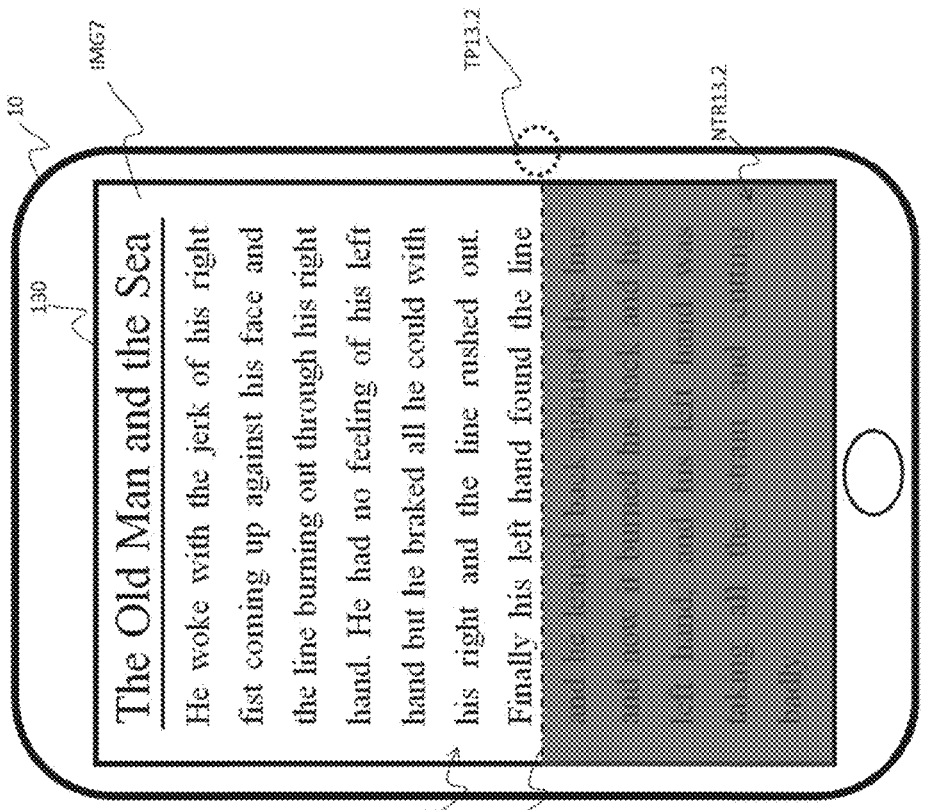
FIG. 13B is a schematic diagram of identifying a triggered target point according to a further embodiment of the invention.
Figure 13A:
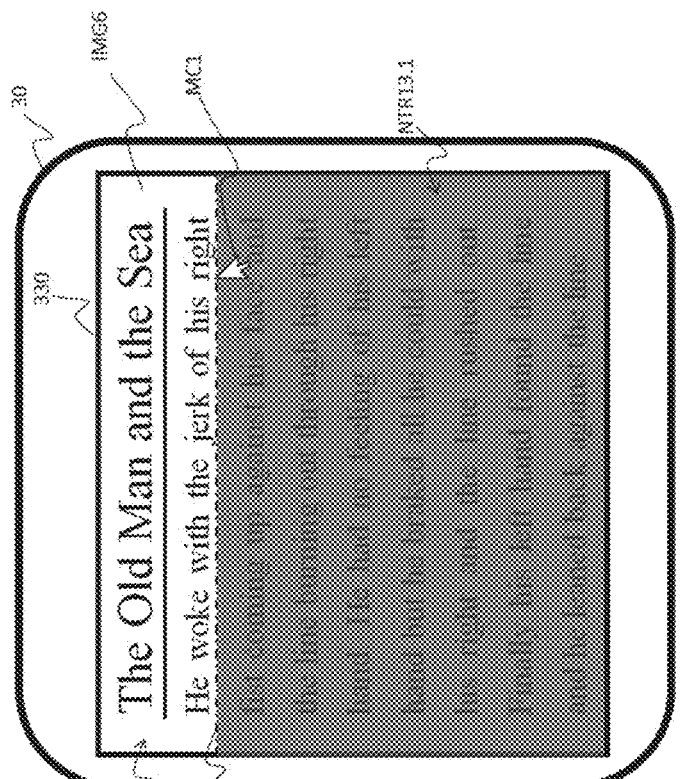
FIG. 13A is a schematic diagram of identifying a triggered target point according to an embodiment of the invention.

FIG. 13A is a schematic diagram of identifying a triggered target point according to an embodiment of the invention. Referring to FIG. 13A, for example, assume that the image IMG6 is displayed on the screen 330 (output device) of the electronic device 30 (e.g., a personal computer) has multiple lines of text content and a cursor MC1. The processor 110 can identify the position of the cursor MC1 as the target location, and thereby set the target separation line TSL13.1 (assuming that the preset separation pattern is the second separation pattern) to identify the target region TR13.1 and the non-target region NTR13.1 (assuming that the preset covering pattern is the first covering pattern), and then performing a covering operation on the non-target region NTR13.1 to reduce the readability of the text content in the non-target region NTR13.1. In other words, by using the electronic device 30 provided by the embodiment of the present invention, the user can clearly recognize the currently read text content (e.g., text content in the target region) using the mobile cursor, and the user can see what region of the image on which the text content, which has not been read and is arranged after the currently read text content, locates, thereby improving the user's reading experience. In one embodiment, in response to receiving an input operation corresponding to a specific key being pressed, the processor 110 starts to identify the current target location of the cursor MC1.

FIG. 13B is a schematic diagram of identifying a triggered target point according to a further embodiment of the invention. Referring to FIG. 13B, for example, assume that the image IMG7 is displayed on the screen 130 (I/O device) of the electronic device 10 (e.g., a mobile phone) has multiple lines of text content. The processor 110 detects the point where the pressure of the gripping operation applied by the user is the largest through the detector provided at the edge of the body of the electronic device 10, and identifies that the location of the target point TP13.2 is pressed. The processor 110 may set the target separation line TSL13.2 (assuming that the preset separation pattern is the second separation pattern) according to the position of the target point TP13.2 to identify the target region TR13.2 and the non-target region NTR13.2 (assuming that the preset covering pattern is the first covering pattern), and then perform a covering operation on the non-target region NTR 13.2 to reduce the readability of the text content in the non-target region NTR 13.2. In one embodiment, the position of the target point TP13.2 can also be detected in response to the sliding operation applied to the edge of the electronic device 10.

It should be noted that, in an embodiment, the processor 110 may also use a plurality of special marks corresponding to multiple sentences in the text content (e.g., periods, semicolons, predetermined punctuation marks, or a set virtual marks) to identify the respective content regions of the multiple sentences, and identify, according to the multiple content regions corresponding to the multiple sentences and the target location of the currently identified triggered target point, the target content region, and then cover the corresponding non-target region. This will be described below by FIG. 14.

Figure 14:
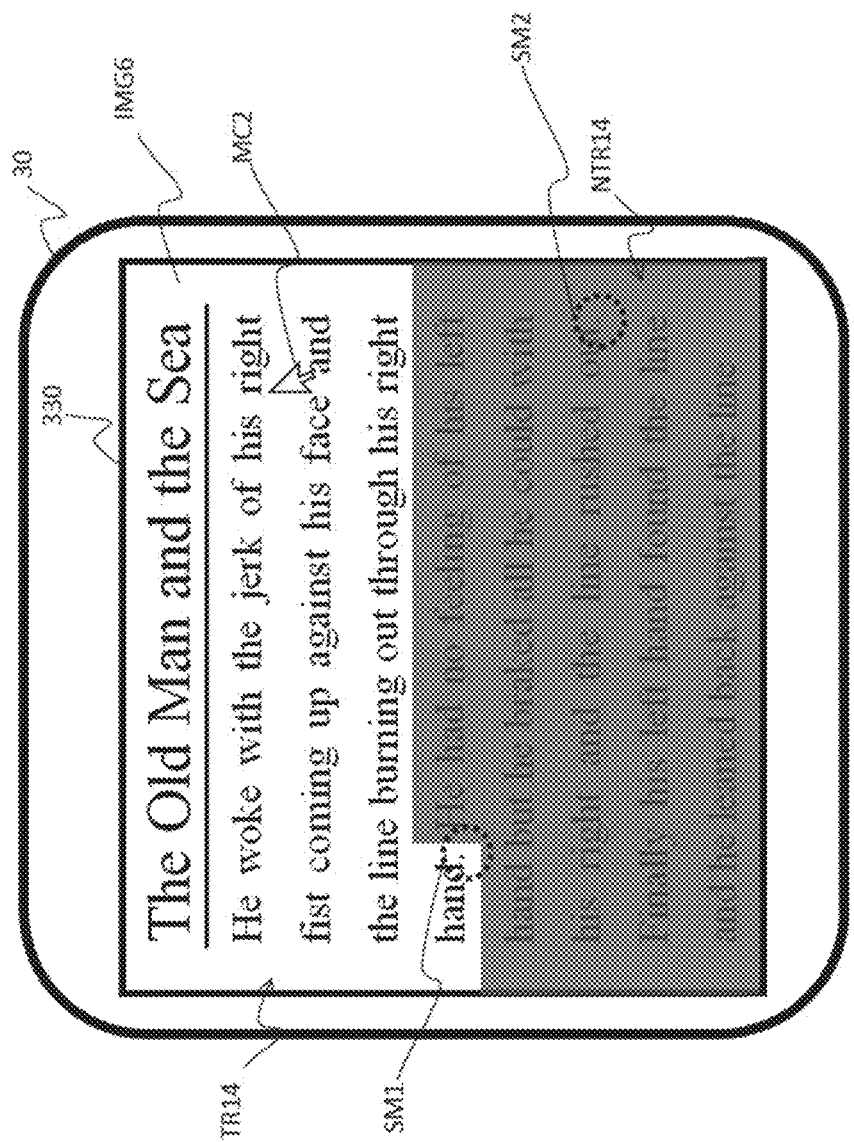
FIG. 14 is schematic diagram of identifying a non-target region and adjusting the readability of the non-target region according to an embodiment of the invention.

FIG. 14 is schematic diagram of identifying a non-target region and adjusting the readability of the non-target region according to an embodiment of the invention. Referring to FIG. 14, following the example of FIG. 13A, for example, assume that the image IMG6 displayed on the screen 330 (output device) of the electronic device 30 (e.g., personal computer) has multiple lines of text content and a cursor MC2. The processor 110 may recognize that the location of the cursor MC2 is the target location. In addition, the processor 110 may identify the special marks SM1 and SM2 in the image IMG6 (as the period shown in FIG. 14), and identify the sentence "He woke with the jerk of his right fist coming up against his face and the line burning out through his right hand" corresponding to the special mark SM1 and the corresponding content region, and identify the sentence" He had no feeling of his left hand but he braked all he could with his right and the line rushed out "corresponding to the special mark SM2 and the corresponding content region.

The processor 110 takes the content area corresponding to the special mark SM1 as the target content area, and divides the target content area and the content area/text content sorted before the target content area into the target area TR14. Furthermore, the processor 110 divides all content areas/text contents sorted after the target content area into non-target areas NTR14. Next, the processor 110 performs a covering operation on the non-target region NTR14 (e.g., using a translucent dark color block to cover the non-target region NTR14).

It should be mentioned that, in the embodiment, the target point includes one of followings: (1) a touch point touched by a user on the screen, wherein the screen is a touch screen; (2) a further touch point, which is touched or pressed by the user, on an edge of a body of the electronic device; (3) a cursor displayed in the screen; and (4) a movable indicator displayed in the screen, wherein a location of the movable indicator is changed by an input operation performed to the I/O device of the electronic device by the user.

Based on above, the display method and the electronic device provided by the embodiments of the invention are capable of setting a corresponding target separation line by detecting a target location of a triggered target point, so as to efficiently identify a target region and a non-target region(s) on an image of the electronic device. Accordingly, the provided display method and the electronic device may adjust the non-target region to decrease the readability of the non-target region, such that the user may focus on the content currently read, so as to improve the efficiency of the electronic device and increase the functionality of the displaying performed by the electronic device.

The above-disclosed embodiments should be understood to be merely exemplary, but not restrictive in all aspects. The scope of the invention is defined by the appended claims, not by the above description, and is intended to include all modifications within meanings and scopes equivalent to the scope of the claims.

What is claimed is:

1. A display method adapted for an electronic device, comprising:
   identifying a target location of a target point which is triggered last in an image, wherein the image is an interface, which is displayed in a screen of the electronic device, of an application performed in the electronic device, wherein the screen is a touch screen, wherein the target point is triggered by an input operation applied on a I/O device of the electronic device, wherein the target point comprises a touch point identified by a processor of the electronic device through the screen in response to a touch operation applied on the screen;
   displaying multiple lines of text in the screen;
   setting, according to an identified preset separation pattern, a target separation line on the image based on the target location;
   identifying, according to an identified preset covering pattern, one target region and one non-target region of the image based on the target separation line, wherein the target region is above the target separation line, and a first group of the lines of the text is within the target region, wherein the non-target region is beneath the target separation line, and a second group of the lines of the text is within the non-target region, wherein the number of the target separation line for distinguishing the target region from the non-target region is fixed at one, wherein, when the target location of the target point is changed to a new target location, a position of the target separation line is changed by the new target location, and the target region and the non-target region are changed based on the changed target separation line; and adjusting the non-target region to decrease a readability of the text in the non-target region, comprising:

performing a covering operation on the non-target region, wherein none of covering operation is performed on the target region such that the text in the target region has a readability the same before and after performing the covering operation, so as to keep the readability of the target region free from decrease, such that the text in the target region is emphasized by comparing to the text in the non-target region having lower readability.

2. The display method according to claim 1, wherein the target point further comprises one of followings:

a further touch point, which is touched or pressed by the user, on an edge of a body of the electronic device;

a cursor displayed in the screen; and a movable indicator displayed in the screen, wherein a location of the movable indicator is changed by an input operation performed to the I/O device of the electronic device by the user.

3. The display method according to claim 1, wherein the preset separation pattern comprises a virtual horizontal line which is located between a pair of the adjacent lines of text and is free from overlapping with the text.

4. The display method according to claim 3, wherein a position of an upper border of the target region is fixed, and a position of a bottom border of the non-target region is fixed.

5. The display method according to claim 3, wherein changing the position of the target separation line to the new target location comprises:

moving the target separation line downward with the target separation line being free from overlapping with the text during changing the position of the target separation line.

6. The display method according to claim 1, wherein the target region serves as an already read region in response to the touch operation and the non-target region serves as an unread region in response to the touch operation.

7. An electronic device, comprising:

a storage device, configured to store program codes;

an input/output device (I/O device), which is a touch screen;

a processor, electronically coupled to the storage device and the I/O device, wherein the processor is configured to perform an application, and display an image corresponding to an interface of the application via the I/O device, wherein the processor is further configured to execute the program codes to implement a display method, and the display method comprises:

identifying a target location of a target point which is triggered last in the image, wherein the target point is triggered by an input operation applied on the I/O device of the electronic device, wherein the target point comprises a touch point identified by the processor through the I/O device in response to a touch operation applied on the I/O device;

displaying multiple lines of text in the touch screen;

setting, according to an identified preset separation pattern, a target separation line on the image based on the target location;

identifying, according to an identified preset covering pattern, one target region and one non-target region of the image based on the target separation line, wherein the target region is above the target separation line, and a first group of the lines of the text is within the target region, wherein the non-target region is beneath the target separation line, and a second group of the lines of the text is within the non-target region, wherein the number of the target separation line for distinguishing the target region from the non-target region is fixed at one, wherein, when the target location of the target point is changed to a new target location, a position of the target separation line is changed by the new target location, and the target region and the non-target region are changed based on the changed target separation line; and adjusting the non-target region to decrease a readability of the non-target region, comprising:

performing a covering operation on the non-target region, wherein none of covering operation is performed on the target region such that the target region has a readability the same before and after performing the covering operation, so as to keep the readability of the target region free from decrease, such that the target region is emphasized by comparing to the non-target region having lower readability.

8. The electronic device according to claim 7, wherein the target point further comprises one of followings:

a further touch point, which is touched or pressed by the user, on an edge of a body of the electronic device;

a cursor displayed in the screen; and a movable indicator displayed in the screen, wherein a location of the movable indicator is changed by an input operation performed to the I/O device of the electronic device by the user.

9. The electronic device according to claim 7, wherein the preset separation pattern comprises a virtual horizontal line which is located between a pair of the adjacent lines of text and is free from overlapping with the text.

10. The electronic device according to claim 9, wherein a position of an upper border of the target region is fixed, and a position of a bottom border of the non-target region is fixed.

11. The electronic device according to claim 9, wherein changing the position of the target separation line to the new target location comprises:

moving the target separation line downward with the target separation line being free from overlapping with the text during changing the position of the target separation line.

12. The electronic device according to claim 7, wherein the target region serves as an already read region in response to the touch operation and the non-target region serves as an unread region in response to the touch operation.

13. A display method adapted for an electronic device, comprising:

displaying multiple lines of text in region of a screen;

sensing a touch point within the region in response to a touch operation applied on the screen by a processor;

setting a target separation line within the region such that an entirety of the region for displaying the lines of the text is divided into a first area and a second area, wherein the first area has a bottom-most border coinciding with the target separation line and the second area has a top-most border coinciding with the target separation line, wherein the number of the target separation line is fixed at one; and performing a covering operation on second area, such that a first group of the text in the first area has a readability the same before and after performing the covering operation and that a second group of the text in the second group has a readability decreasing after performing the covering operation.

14. The display method according to claim 13, further comprising:

identifying which one of the lines of text is closest to the touch point; and setting the target separation line between a first line and a second line of the lines of text which are adjacent to each other, wherein the touch point is within the first line and out of the second line.

15. The display method according to claim 14, further comprising:

moving downward the target separation line to a position between the second line and a third line of the lines of text which are adjacent to each other, wherein the target separation line is free from the overlapping with the text during moving downward the target separation line.

16. The display method according to claim 13, wherein the covering operation is performed by decreasing a brightness of the second area, such that the first area above the target separation line has a brightness the same before and after performing the covering operation and that the second area beneath the target separation line has the brightness decreasing after performing the covering operation.

17. The display method according to claim 13, wherein the covering operation is performed by using a block to cover the second area, wherein the block has a top-most border coinciding with the target separation line and a bottom-most border coinciding with a function bar.

18. The display method according to claim 13, wherein the covering operation is performed by using a block to cover the second area, wherein the block has a first top border coinciding with the target separation line and a second top border exceeding the target separation line.

19. The display method according to claim 13, further comprising:

displaying an image in the screen, wherein the image is located beneath the target separation line and has a readability the same before and after performing the covering operation.

20. The display method according to claim 13, wherein the target separation line is set at a position near the touch point without overlapping with the touch point.

* * * * *